(12) United States Patent
Kurita et al.

(10) Patent No.: US 8,832,441 B2
(45) Date of Patent: *Sep. 9, 2014

(54) MOBILE TERMINAL, DATA COMMUNICATION METHOD, AND COMPUTER PROGRAM

(75) Inventors: Taro Kurita, Tokyo (JP); Toshiharu Takemura, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/870,244

(22) Filed: Aug. 27, 2010

(65) Prior Publication Data

US 2010/0325713 A1 Dec. 23, 2010

Related U.S. Application Data

(63) Continuation of application No. 11/560,656, filed on Nov. 16, 2006, now Pat. No. 7,797,537.

(30) Foreign Application Priority Data

Nov. 18, 2005 (JP) ................. P2005-334052

(51) Int. Cl.
| | | |
|---|---|---|
| *H04L 29/06* | (2006.01) | |
| *H04L 9/32* | (2006.01) | |
| *G06F 21/35* | (2013.01) | |
| *G06F 21/34* | (2013.01) | |
| *G06F 21/45* | (2013.01) | |
| *H04L 9/08* | (2006.01) | |
| *G06Q 20/32* | (2012.01) | |
| *G06Q 20/40* | (2012.01) | |
| *G06Q 20/34* | (2012.01) | |

(52) U.S. Cl.
CPC .......... *H04L 9/3273* (2013.01); *H04L 63/0428* (2013.01); *G06F 21/35* (2013.01); *G06F 21/34* (2013.01); *H04L 63/04* (2013.01); *G06F 2211/003* (2013.01); *G06F 21/45* (2013.01); *G06Q 20/3229* (2013.01); *G06Q 20/4093* (2013.01); *G06Q 20/34* (2013.01); *H04L 9/0844* (2013.01); *H04L 9/0894* (2013.01); *H04L 2209/805* (2013.01)
USPC .......... 713/169; 713/168; 713/170; 713/171; 713/175; 713/182; 726/2; 726/4; 726/5; 726/9; 726/17; 726/20; 726/21; 726/27; 726/29; 726/30; 380/247; 380/255; 380/259; 380/277; 380/29; 235/375; 235/380; 235/382

(58) Field of Classification Search
CPC ......... H04L 9/32; H04L 9/006; H04L 9/0813; H04L 9/0844; H04L 9/06; H04L 9/0825; H04L 9/28; H04L 9/30; H04L 29/06755; H04L 29/06816; H04L 29/12518; H04L 29/06802; H04L 29/066; H04L 63/08; H04L 63/06; H04L 63/04; H04L 12/40104; H04L 9/0894; G06F 21/30; G06F 21/34; G06F 21/35; G06F 21/44; G06F 21/60; G06F 2211/003; G06F 2211/007; G06F 2211/008; G06F 2221/2107; G06F 2221/60; G06F 21/62; G06Q 20/409; G06Q 20/32; G06Q 20/3229; G06Q 20/34; G06Q 20/35
USPC .............. 713/168–175, 182–186; 726/26–30, 726/1–21; 380/255–259, 270–30, 247–250, 380/277–30; 235/375–382.5
See application file for complete search history.

(56) References Cited

U.S. PATENT DOCUMENTS

| | | | |
|---|---|---|---|
| 6,504,932 B1* | 1/2003 | Vasnier et al. ................. | 380/273 |
| 7,648,075 B2* | 1/2010 | Ota et al. ....................... | 235/492 |
| 2003/0136827 A1* | 7/2003 | Kaneko et al. ................. | 235/375 |
| 2005/0114619 A1* | 5/2005 | Matsuo et al. ................. | 711/170 |
| 2005/0127166 A1* | 6/2005 | Minemura ..................... | 235/380 |
| 2005/0167512 A1* | 8/2005 | Minemura et al. ............ | 235/492 |

| | | | |
|---|---|---|---|
| 2006/0049243 | A1* | 3/2006 | Sakamura et al. ............. 235/380 |
| 2006/0288407 | A1* | 12/2006 | Naslund et al. .................... 726/9 |
| 2008/0051142 | A1* | 2/2008 | Calvet et al. .................. 455/558 |

FOREIGN PATENT DOCUMENTS

| | | |
|---|---|---|
| JP | 10-20780 | 1/1998 |
| JP | 10-327142 | 12/1998 |
| JP | 11-285080 | 10/1999 |

OTHER PUBLICATIONS

Japanese Office Action issued on Jun. 16, 2009, for corresponding Japanese Patent Appln. No. 2005-334052.

Hisafumi Yoshinaga, and others, Development of i-mode Felica, NTT DoCoMo Technical journal, Japan, NTT DoCoMo, Oct. 2004, vol. 12, No. 3, pp. 35-32.

Research about the on-line contents business utilizing electronic account settlement, Ministry of Economy, Trade and Industry consigned research papers, Japan, information communication network industry association, Mar. 2005, Chapter 4.1.2.

* cited by examiner

*Primary Examiner* — Madhuri Herzog
(74) *Attorney, Agent, or Firm* — K&L Gates LLP

(57) ABSTRACT

A mobile terminal includes a near-field communication device capable of performing near-field wireless communication with an external device, and a controller configured to instruct the external device or the near-field communication device to execute a command. The near-field communication device has a storage unit, a first mutual authentication unit for authenticating the controller and for requesting the controller to authenticate the near-field communication device, a first communication key setting unit for setting a first communication key, a second mutual authentication unit for authenticating the external device and for requesting the external device to authenticate the near-field communication device, and a second communication key setting unit for setting a second communication key. The controller and the near-field communication device perform secure communication using the first communication key, and the near-field communication device and the external device perform secure communication using the second communication key.

12 Claims, 10 Drawing Sheets

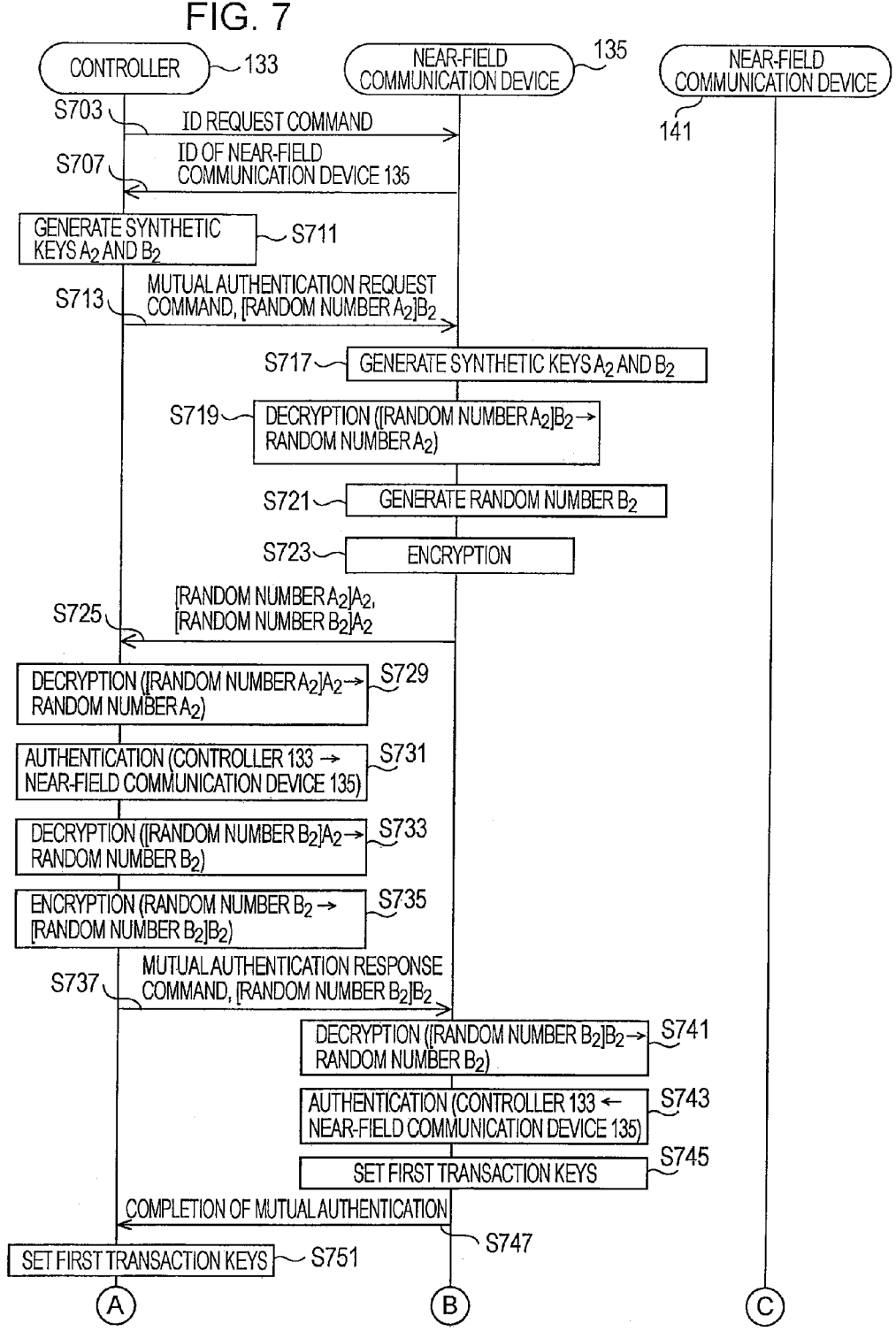

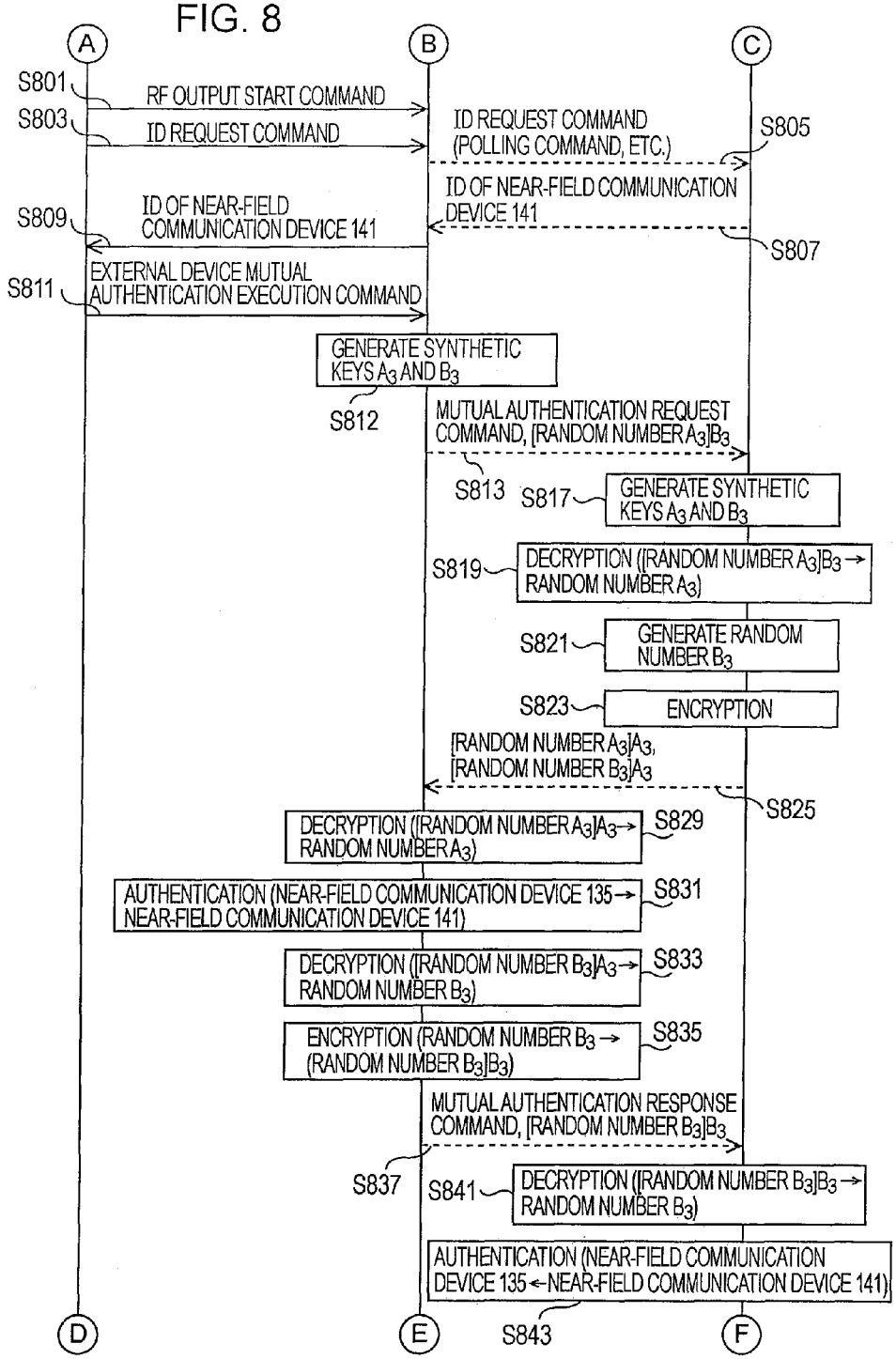

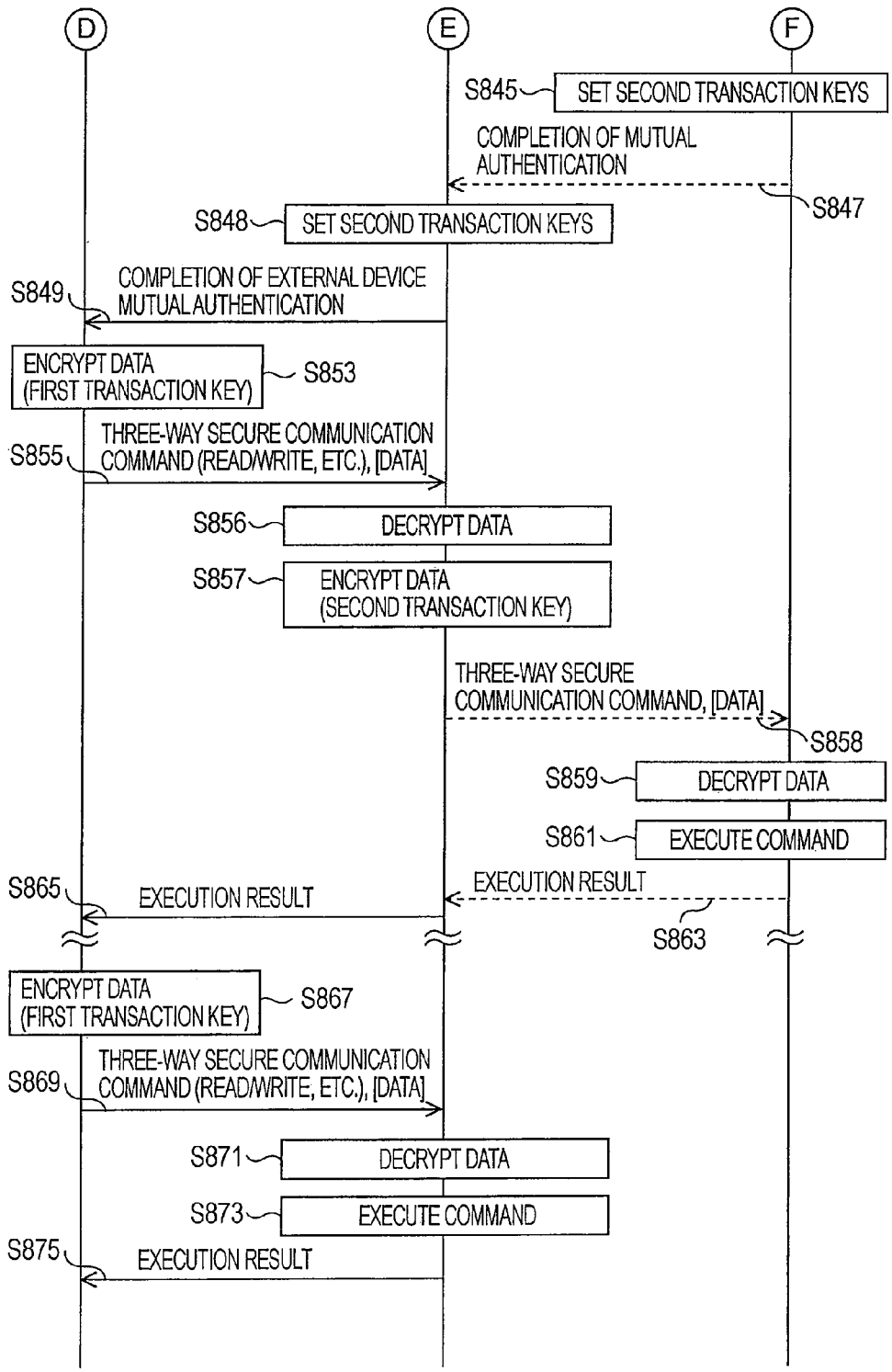

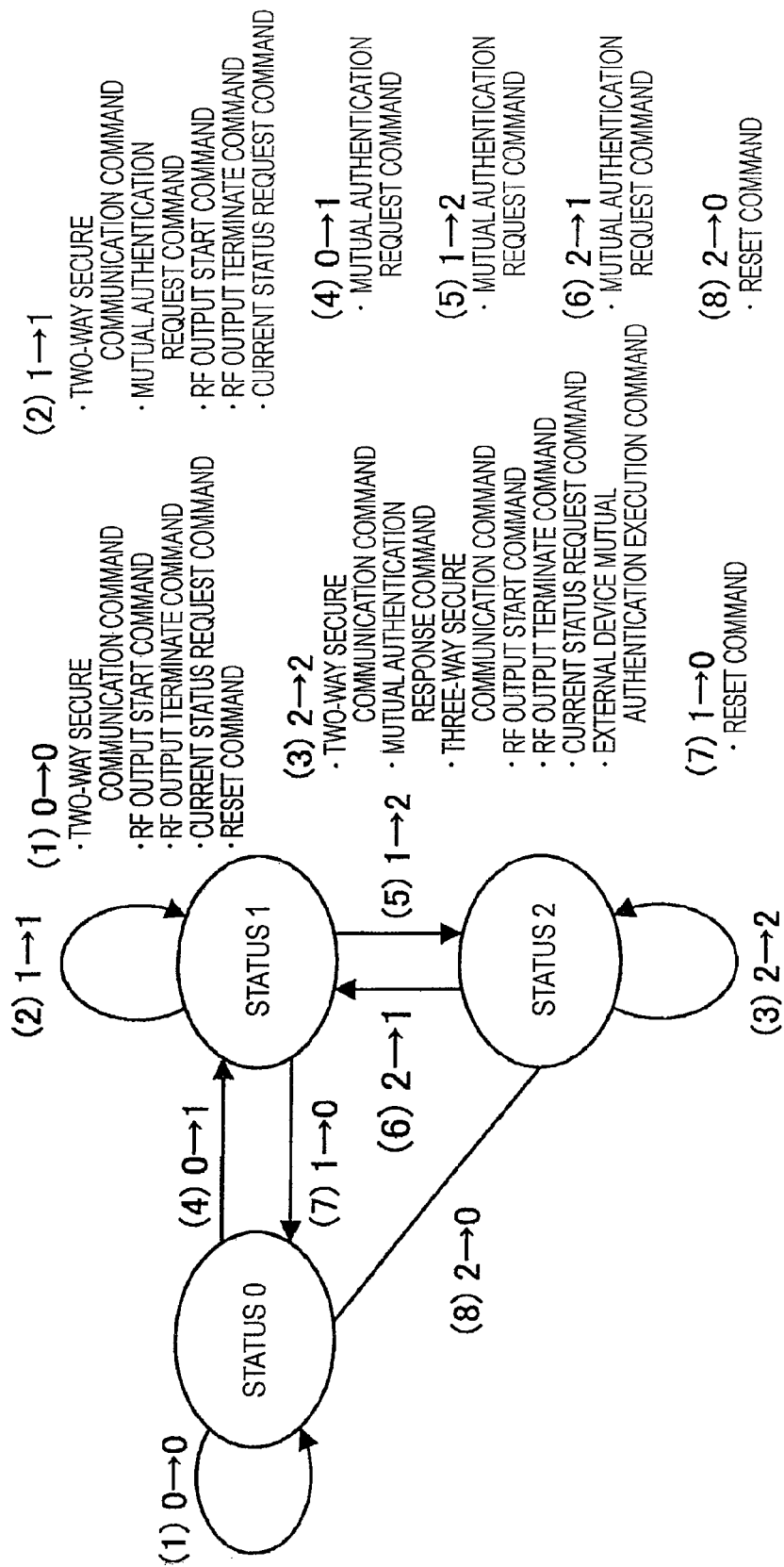

MOBILE TERMINAL, DATA COMMUNICATION METHOD, AND COMPUTER PROGRAM

CROSS REFERENCES TO RELATED APPLICATIONS

The present application is a continuation that claims priority to U.S. patent application Ser. No. 11/560,656, filed on Nov. 16, 2006, which claims priority to Japanese Patent Application No. 2005-334052 filed in the Japanese Patent Office on Nov. 18, 2005, the entire contents of which is incorporated herein by reference.

BACKGROUND

The present application relates to mobile terminals, and in particular, to data communication performed between a mobile terminal and an external device.

Contactless IC (Integrated Circuit) cards are capable of performing near-field or proximity wireless communication. With development in information technologies, users can now cause automatic ticket checkers equipped at station ticket gates to open/close the gates utilizing contactless IC cards or the like so as to pass through the gates.

In the above-mentioned automatic ticket checker system or the like, mutual authentication is performed between a reader/writer (R/W) and a contactless IC card. The automatic ticket checker opens/closes the gates on the basis of ticket information, such as commuter pass information, stored in a secure storage area in the contactless IC card (See, for example, Japanese Unexamined Patent Application Publication No. 10-20780).

Contactless IC card technologies have been rapidly developing. The contactless IC cards can perform data processing in a short time period, which is advantageous with respect to security. Contactless IC cards are now widely used in systems, such as a public transportation entrance system and an office attendance management system.

Furthermore, mobile phones include contactless IC chips (or a near-field communication device), which are the above-described contactless IC card modules. Users can now buy products with the mobile phones.

However, most of the above-described systems are only compatible with communication initiated from a reader/writer or an external device to a contactless IC chip. That is, most of the above-described systems are not compatible with communication initiated from a contactless IC chip to another contactless IC chip included in a mobile terminal (i.e., an external device), such as a mobile phone and PDA (Personal Digital Assistant), which exists outside the contactless IC chip.

SUMMARY

In an embodiment, mobile terminal allowing near-field communication devices included therein to perform more general communication is provided.

To this end, according to an embodiment, a mobile terminal including a near-field communication device capable of performing near-field wireless communication with an external device, and a controller configured to instruct the external device or the near-field communication device to execute a command is provided. The near-field communication device included in the mobile terminal has a storage unit in which a controller authentication key storage area for storing a controller authentication key used for mutual authentication with the controller and an external device access key storage area for storing an external device access key used for accessing the external device are allocated, a first mutual authentication unit for authenticating, in response to a mutual authentication request given by the controller, the controller as being valid on the basis of the controller authentication key and for requesting the controller to authenticate the near-field communication device as being valid, a first communication key setting unit for setting a first communication key used between the controller and the near-field communication device on the basis of a result of the authentication operation performed by the first mutual authentication unit, a second mutual authentication unit for authenticating, in response to a mutual authentication request applied between the near-field communication device and the external device given by the controller, the external device as being valid on the basis of the external device access key and for requesting the external device to authenticate the near-field communication device as being valid, and a second communication key setting unit for setting a second communication key used between the near-field communication device and the external device on the basis of a result of the authentication operation performed by the second mutual authentication unit. The controller and the near-field communication device, which have authenticated each other, perform secure communication using the first communication key. The near-field communication device and the external device, which have authenticated each other, perform secure communication using the second communication key.

According to an embodiment, the mutual authentication and secure communication is performed at least one of between the controller and the near-field communication device, between the near-field communication device and the external device, and between the controller and the external device. Such a configuration allows the near-field communication device not only to read/write data stored therein but also to read/write data stored in the external device in response to instructions given by the controller, thus improving the versatility of communication performed by the near-field communication device and the convenience of the mobile terminal. In addition, the controller can access and read/write data in the external device and the near-field communication device.

The controller and the near-field communication device may be configured to performed secure communication therebetween using the first communication key. Such a configuration allows the near-field communication device to securely send data held therein to the controller, for example. In addition, for example, the controller then displays the data on a display unit thereof. Accordingly, the near-field communication device and the controller can efficiently perform mutual authentication without obtaining authentication keys used for the mutual authentication therebetween from a device, such as a server, via a communication network, such as the Internet, and the controller can access the near-field communication device and read/write the data.

A value information storage area for storing value information may be further allocated in the storage unit included in the near-field communication device, and the value information stored in the value information storage area may be accessible with the first communication key. Here, although the controller or the external device accesses the value information, the subject accessing the value information is not limited to this particular example. The above-described configuration allows the controller to, for example, display the value information on a screen, which further allows a user to easily know balance information.

The mutual authentication key stored in the controller mutual authentication key storage area of the storage unit may be configured to be sent from a server via a communication network.

Instead of the mutual authentication performed by the first and second mutual authentication units, the mutual authentication may be performed between the controller and the external device, and the secure communication may be performed between the controller and the external device. According to such a configuration, the mutual authentication is not performed with the near-field communication device but is performed between the controller and the external device, and the secure communication is performed between the controller and the external device. This reduces the number of mutual authentication. The controller and the external device can perform the data communication without lowering the security level.

The near-field communication device may decrypt, upon receiving predetermined data from the controller, the data with the first communication key, process the decrypted data, encrypt the processed data with the second communication key, and transmit the encrypted data to the external device. According to such a configuration, the near-field communication device transmits, after processing the data received from the controller, the data to the external device. Thus, the near-field communication device can perform data processing, such as appending additional information to the data.

Whether or not the secure communication is executable between controller and the external device, between the controller and the near-field communication device, or between the near-field communication device and the external device may be determined on the basis of statuses regarding completion of the mutual authentication performed on the near-field communication device. According to such a configuration, a reference to the statuses allows the determination of whether or not the secure communication is executable to be easily performed, thus preventing false secure communication from being performed.

According to another embodiment, a data communication method for a mobile terminal having a near-field communication device capable of performing near-field wireless communication with an external device and a controller configured to instruct the external device or the near-field communication device to execute a command is provided. The data communication method includes a step of allocating a controller authentication key storage area for storing a controller authentication key used for mutual authentication with the controller and an external device access key storage area for storing an external device access key used for accessing the external device in a storage unit included in the near-field communication device, a first mutual authentication step of authenticating, in response to a mutual authentication request given by the controller, the controller as being valid on the basis of the controller authentication key and of requesting the controller to authenticate the near-field communication device as being valid, a first communication key setting step of setting a first communication key used between the controller and the near-field communication device on the basis of a result of the authentication operation performed at the first mutual authentication step, a second mutual authentication step of authenticating, in response to a mutual authentication request applied between the near-field communication device and the external device given by the controller, the external device as being valid on the basis of the external device access key and of requesting the external device to authenticate the near-field communication device as being valid, and a second communication key setting step of setting a second communication key used between the near-field communication device and the external device on the basis of a result of the authentication operation performed at the second mutual authentication step. The controller and the near-field communication device, which have authenticated each other, perform secure communication using the first communication key. The near-field communication device and the external device, which have authenticated each other, perform secure communication using the second communication key.

According to still another embodiment, a computer program causing a mobile terminal to execute a data communication process is provided. The mobile terminal has a near-field communication device capable of performing near-field wireless communication with an external device and a controller configured to instruct the external device or the near-field communication device to execute a command. The data communication process includes a step of allocating a controller authentication key storage area for storing a controller authentication key used for mutual authentication with the controller and an external device access key storage area for storing an external device access key used for accessing the external device in a storage unit included in the near-field communication device, a first mutual authentication step of authenticating, in response to a mutual authentication request given by the controller, the controller as being valid on the basis of the controller authentication key and of requesting the controller to authenticate the near-field communication device as being valid, a first communication key setting step of setting a first communication key used between the controller and the near-field communication device on the basis of a result of the authentication operation performed at the first mutual authentication step, a second mutual authentication step of authenticating, in response to a mutual authentication request applied between the near-field communication device and the external device given by the controller, the external device as being valid on the basis of the external device access key and of requesting the external device to authenticate the near-field communication device as being valid, and a second communication key setting step of setting a second communication key used between the near-field communication device and the external device on the basis of a result of the authentication operation performed at the second mutual authentication step. The controller and the near-field communication device, which have authenticated each other, perform secure communication using the first communication key. The near-field communication device and the external device, which have authenticated each other, perform secure communication using the second communication key.

As described above, according to an embodiment, the near filed communication device included in the mobile terminal holds not only an access key used for accessing the storage area but also another access key, for example, used for accessing an external device. This allows the near-field communication device to perform more general communication with a reader/writer or an external device, such as a mobile phone.

Additional features and advantages are described herein, and will be apparent from, the following Detailed Description and the figures.

BRIEF DESCRIPTION OF THE FIGURES

FIG. 7 is a sequence diagram schematically showing an example of a three-way secure communication according to an embodiment.

FIG. 8 is a sequence diagram schematically showing an example of a three-way secure communication according to an embodiment.

FIG. 9 is a sequence diagram schematically showing an example of a three-way secure communication according to an embodiment.

FIG. 10 is an explanatory diagram schematically showing statuses and status transitions in data communication according to an embodiment.

DETAILED DESCRIPTION

Embodiments will be described in detail below with reference to the accompanying drawings. In the description given below and the accompanying drawings, elements having substantially the same functions and configurations are denoted by the same numerals in order to omit a repetition of the description.

(Data Communication System)

Figure 1:
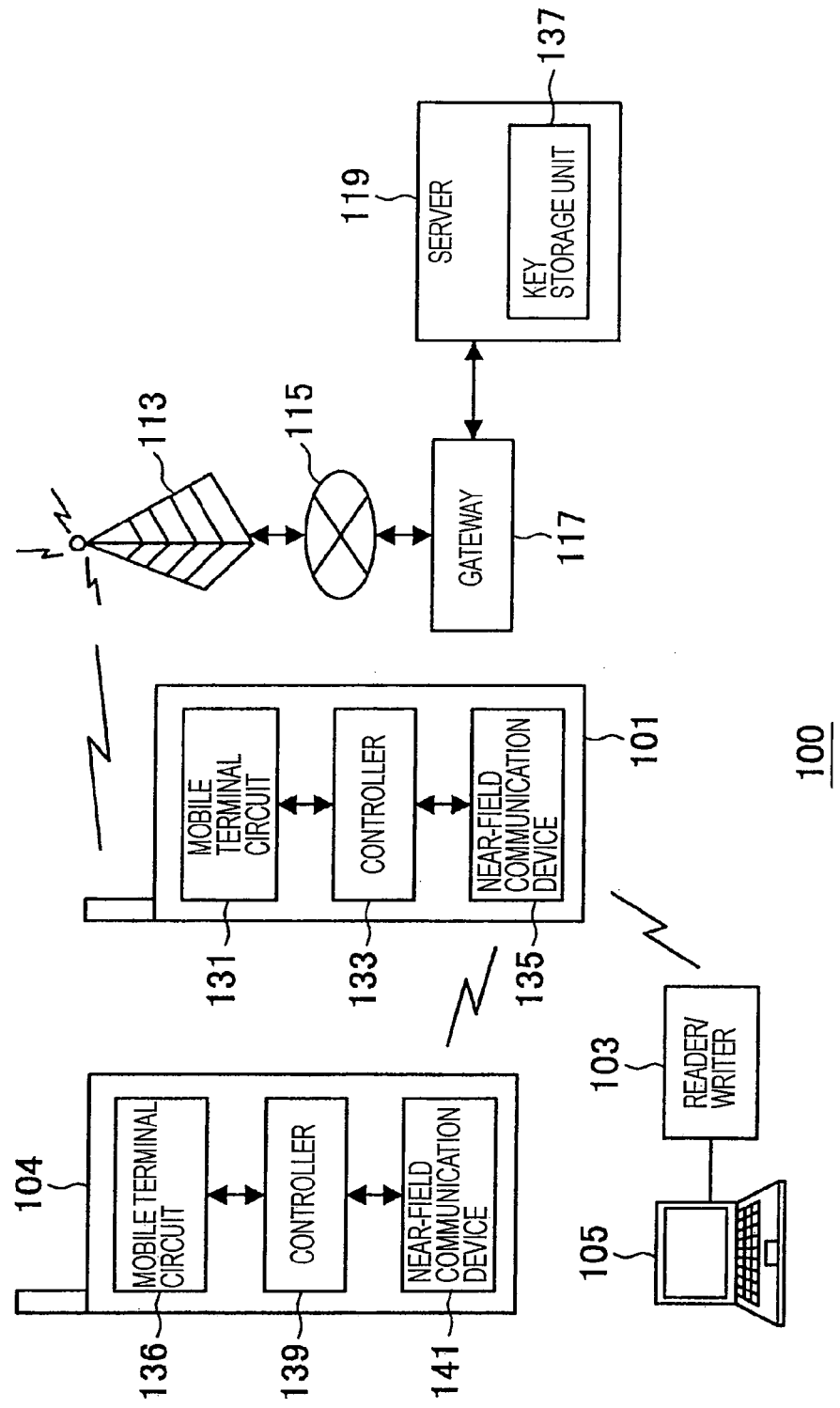
FIG. 1 is a schematic diagram showing an example of an overview of a data communication system according to an embodiment.

Now, referring to FIG. 1, a data communication system 100 according to an embodiment will be described. FIG. 1 is a schematic diagram showing an example of an overview of the data communication system 100 according to the embodiment.

As shown in FIG. 1, the data communication system 100 includes a mobile terminal 101, a reader/writer (R/W) 103, an external mobile terminal 104, an information processing apparatus 105, a base station 113, a packet communication network 115, a gateway 117, and a server 119. The reader/writer 103 and/or the external mobile terminal 104, with which the mobile terminal 101 shown in FIG. 1 performs near-field wireless communication, may be collectively referred to as "external devices".

In addition, as shown in FIG. 1, the description is given below for a case where the data communication system 100 according to the embodiment includes only one mobile terminal 101, one external mobile terminal 104, and one reader/writer 103 for example. However, the data communication system 100 is not limited to this particular example. For example, the data communication system 100 may includes a plurality of mobile terminals 101 (i.e., 101a, 101b, ... 101n), a plurality of readers/writers 103 (i.e., 103a, 103b, ... 103n), and a plurality of external mobile terminals 104 (i.e., 104a, 104b, ... 104n).

The data communication system 100 is a system that performs the following processing. For example, the data communication system 100 communicates with external devices in response to requests given by a controller 133 of the mobile terminal 101. Additionally, the data communication system 100 stores data in a near-field communication device (or a contactless IC (Integrated Circuit) card module) 135.

Kinds of data stored in the near-field communication device 135 include, for example, point information, electronic money information, and coupon information. Such data is referred to as "electronic value information" or simply referred to as "value information". That is, the electronic value information is exchanged over a network and has a predetermined value such as a monetary value. Furthermore, a verb "charge" may mean to increase an electronic money balance by depositing money.

The mobile terminal 101 is portable and is capable of performing communication. More specifically, the mobile terminal 101 is capable of performing a verbal communication function implemented via the base station 113 and accessing to the server 119 via the base station 113, the packet communication network 115, and the gateway 117.

Here, accessing to the server indicates various kinds of information processing performed on information wirelessly or via networks (e.g., communication networks) such as utilization of a system, connection to a server or other devices, reference to data, storage of data, deletion of data, and modification of data.

The server 119 includes a key storage unit 137. The key storage unit 137 is a storage unit having tamper resistance. The key storing unit 137 stores authentication keys for each mobile terminal 101. The authentication keys are used for mutual authentication performed, for example, when the controller 133 accesses to storage areas included in the near-field communication device 135.

The controller 133 included in the mobile terminal 101 is capable of reading out and executing client application programs from a mobile terminal circuit 131, and writing data in the near-field communication device 135 or the external mobile terminal 104, for example, upon receiving instructions to execute processing from users. The client application programs have functions such as a browsing function.

In addition, when users put the mobile terminal 101 over the reader/writer 103, the controller 133 included in the mobile terminal 101 becomes capable of wirelessly exchanging data with the information processing apparatus 105 via the near-field communication device 135 and the reader/writer 103.

For example, suppose that data is stored in a storage device, such as a hard disk drive, included in the information processing apparatus 105. When the controller 133 included in the mobile terminal 101 reads this data, the controller 133 becomes capable of reading the data via the near-field communication device 135 and the reader/writer 103 after the controller 133 and the information processing apparatus 105 performs mutual authentication using an authentication key. The authentication key may be stored in the information processing apparatus 105 and the mobile terminal 101 or may be dynamically generated.

The information processing apparatus 105 includes, for example, a control unit, an input unit such as a mouse and a keyboard, a memory such a RAM (Random Access Memory) and a ROM (Read Only Memory), a storage device such as a hard disk drive, an output unit such as a display. More specifically, the information processing apparatus 105 may be a personal computer (PC), for example.

In addition, the near-field communication device 135 holds authentication keys (i.e., external device access keys) used for mutual authentication with the external mobile terminal 104 performed when reading and writing data in the external mobile terminal 104 or the like. Since the external device access keys are highly confidential information, the keys are, but are not limited to, stored in a storage device or the like having tamper resistance, which will be described in detail below.

The external device access keys are any kind of key, such as asymmetric keys and symmetric keys. The asymmetric keys may be, for example, RSA (Rivest Shamir Adleman) keys. The symmetric keys may be, for example, DES (Data Encryption Standard) keys and AES (Advanced Encryption Standard) keys. The symmetric keys have to be distributed to communication partners with the confidentiality thereof being kept. Thus, the symmetric keys are distributed to the communication partners not directly from a communication network but by other methods such as by mail.

(Mobile Terminal 101)

Figure 2:
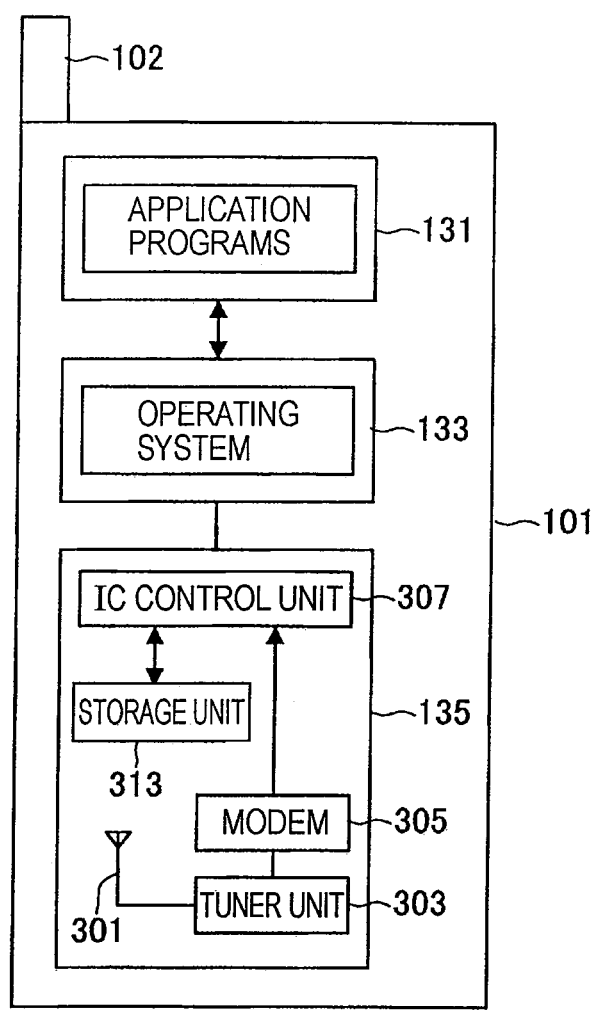
FIG. 2 is a block diagram showing an example of a schematic configuration of a mobile terminal according to an embodiment.

Referring to FIG. 2, a mobile terminal 101 according to an embodiment of present invention will be described next. FIG. 2 is a block diagram showing a schematic configuration of the mobile terminal 101 according to the embodiment.

A mobile terminal circuit 131 has a verbal communication function and a data communication function performed via a base station 113. More specifically, the mobile terminal circuit 131 includes an input unit such as input buttons, a display unit for displaying information such as value information, and an antenna 102 used for verbal communication and data communication. In addition, the mobile terminal circuit 131 includes a storage unit (not shown) such as a RAM and a ROM.

As shown in FIG. 2, the storage unit is capable of storing various data such as application programs for implementing a Web browsing function and for reading and writing the value information stored in a near-field communication device 135.

According to an operating system, the controller 133 activates application programs stored in the mobile terminal circuit 131. A controller 133 also instructs each of the units, such as the mobile terminal circuit 131 and the near-field communication device 135, included in the mobile terminal 101 to execute processing. In addition, the controller 133 controls the processing performed by each unit.

The controller 133 may include a storage unit (not shown). The storage unit may include registers, a volatile memory such as an SRAM (Static Random Access Memory), and a nonvolatile memory such as a ROM and an EEPROM (Electrically Erasable Programmable Read Only Memory). An operating system (hereinafter, referred to as OS) may be installed in the storage unit.

The description is given below for a case where the OS (or firmware) according to the embodiment is installed in cache or registers included in the controller 133 for example. However, the unit storing the OS is not limited to this particular example. For example, the OS may be installed in a storage unit included in the mobile terminal circuit 131. Necessary programs among the OS programs are invoked by the controller 133 and executed as the OS.

Additionally, the mobile terminal 101 includes a power supplying unit (not shown) for supplying electric power necessary for each unit (e.g., the mobile terminal circuit 131, the controller 133, and the near-field communication device 135) included in the mobile terminal 101 to operate.

The electric power may not be supplied to the near-field communication device 135 from the power supplying unit. In such a case, the near-field communication device 135 includes an own power supplying unit therein, and this power supplying unit may supplies the electric power to each unit (e.g., a tuner unit 303, a modulator/demodulator (modem) 305, an IC control unit 307, and a storage unit 313) included in the near-field communication device 135.

The near-field communication device 135 shown in FIG. 2 is capable of wirelessly communicating with a near-field communication device 141 included in an external mobile terminal 104 as long as the near-field communication devices 135 and 141 are placed within a close range (i.e., a communication range) of, for example, 0 to 10 centimeters.

As shown in FIG. 2, the near-field communication device 135 includes an antenna 301 allowing near-field or proximity wireless communication, the tuner unit 303, the modem 305, the IC control unit 307, and the storage unit 313.

The antenna 301 is constituted by a closed loop coil or the like, for example, and outputs an electromagnetic wave when a current flowing through the coil alters. In addition, a current flows through the antenna 301 when a magnetic flux through the coil antenna 301 alters.

The description is given for a case where the antenna 301 according to the embodiment is an integrated antenna for example. More specifically, the antenna 301 has, for example, an antenna used for reading/writing the data stored therein in response to the access from the external reader/writer 103 or the like and an antenna used for reading/writing data from and to a storage area of the external mobile terminal 104 or the like after accessing the external device, such as the external mobile terminal 104. However, the configuration of the antenna 301 is not limited to this particular example, the antenna 301 may be constituted by those two antennas.

The tuner unit 303 receives the current that flows through the antenna 301, and supplies a signal to the modem 305 after performing tuning or detection, for example.

Frequency bands on which the tuner unit 303 performs tuning or filtering may be any frequency at which the value information included in the storage unit 313 and the data such as IDs or the like that can identify the near-field communication device 135 are possibly accessed. For example, the frequency band may be 13.56 MHz.

The modem 305 demodulates the signal supplied from the tuner unit 303, and supplies the demodulated signal to the IC control unit 307. The modem 305 also modulates the signal supplied from the IC control unit 307 so as to transmit the modulated signal via the antenna 301.

The modulation is performed by the modem 305 on the basis of a carrier wave, which is transmitted from the antenna 301 as a radio signal, and the data supplied from IC control unit 307. In addition, during the demodulation, the modem 305 demodulates the data obtained by removing the carrier wave from the radio signal supplied from the tuner unit 303.

The IC control unit 307 decodes the signal, such as, for example, a Manchester code or the like, supplied from the modem 305, and analyzes the code information decoded from the radio signal so as to identify a command or the like included in the received signal.

Kinds of the command include, for example, a polling command, a read command to instruct reading of data, such as IDs, stored in the storage unit 313, a write command to instruct writing of data in the storage area of the storage unit 313. The IDs are identification numbers or the like assigned when the near-field communication device 135 is manufactured at factories or the like.

On the other hand, the IC control unit 307 encodes the data to be transmitted to the near-field communication device 141 included in the external mobile terminal 104 as a radio signal into, for example, the Manchester code, and supplies the encoded signal to the modem 305.

Here, an ASK (Amplitude Shift Keying) modulation technique may be employed as the modulation technique used by the modem 305. However, the modulation technique used by the modem 305 is not limited to ASK, and other techniques such as PSK (Phase Shift Keying) and QAM (Quadrature Amplitude Modulation) may also be employed. In addition, an amplitude modulation factor is not limited to values such as 8% to 30%, 50%, and 100%, and a suitable modulation factor may be selected.

The IC control unit 307 includes a plurality of circuits for controlling the near-field communication device 135. Although not shown in FIG. 2, the IC control unit 307 includes an IC controller, a RAM (Random Access Memory), and a ROM (Read Only Memory).

As described above, the IC controller is a block that performs encoding/decoding of radio signals demodulated by the modem 305.

In addition, the IC controller controls the processing performed by each unit (e.g., the tuner unit 303, the modem 305, the IC control unit 307, and the storage unit 313) included in the near-field communication device 135.

Kinds of the command contained in the radio signal include a polling command and a command used when writing secure information. However, the kinds of the command is not limited to this particular example, and may include, for example, a command used when writing non-secure information, a command used when reading secure information, and a command used when reading non-secure information.

The IC controller according to the embodiment has been described for a case where the encoding/decoding operation is performed using the Manchester code for example. However, the encoding/decoding technique is not limited to this particular example. For example, the encoding/decoding operation may be performed using one encoding code selected from a plurality of kinds of encoding code such as modified mirror and NRZ (Non Return to Zero).

Kinds of communication protocol employed by the near-field communication device 135 according to the embodiment include, for example, NFC (Near-field Communication), ISO/IEC 14443, ISO/IEC 15693 specifying RF (Radio Frequency) tag communication, Bluetooth, UWB (Ultra Wide Band), and IEEE 802.11b.

Although the detailed description is given below, the storage unit 313 has a plurality of storage areas. Information, such as the value information and history information, is stored in the storage areas. The storage unit 313 may be, for example, an EEPROM capable of electrically storing/erasing data. However, the storage unit 313 is not limited to this particular example, and may be any storage unit capable of storing data and erasing the data, if necessary.

Additionally, each unit (e.g., a mobile terminal circuit 136, a controller 139, and the near-field communication device 141) included in the external mobile terminal 104 shown in FIG. 1 has substantially the same configuration as the corresponding unit included in the mobile terminal 101.

Figure 3:
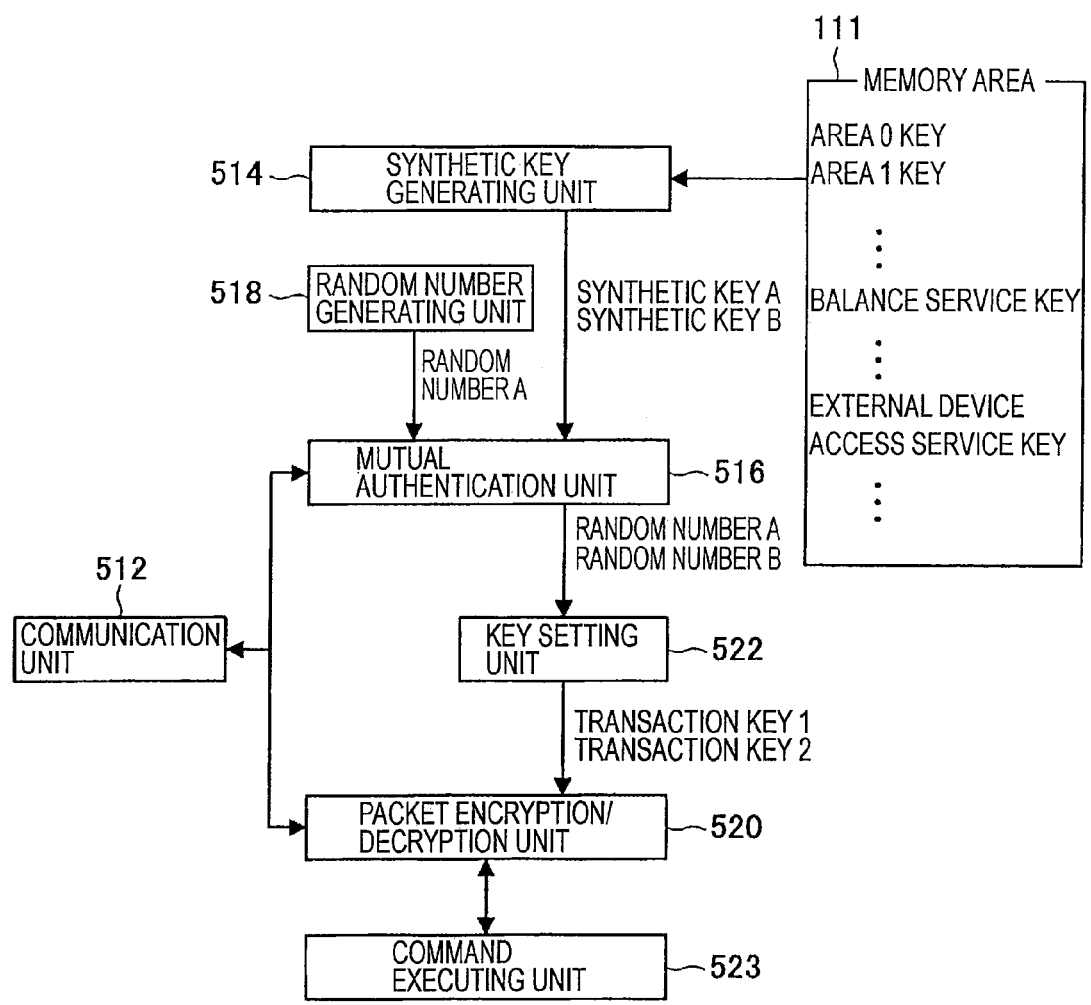
FIG. 3 is a block diagram schematically showing an example of functions of a near-field communication device included in a mobile terminal according to an embodiment.

Now, referring to FIG. 3, main function blocks of a near-field communication device 135 according to an embodiment will be described. FIG. 3 is a block diagram schematically showing function blocks (or modules) of the near-field communication device 135 according to the embodiment.

As shown in FIG. 3, the near-field communication device 135 includes a communication unit 512, a synthetic key generating unit 514, a mutual authentication unit 516, a random number generating unit 518, a packet encryption/decryption unit 520, a key setting unit 522, a command executing unit 523, and a storage area 111. The synthetic key generating unit 514 generates synthetic keys. The mutual authentication unit 516 performs mutual authentication between the near-field communication device 135 and external communication devices using random numbers and synthetic keys. The packet encryption/decryption unit 520 encrypts and decrypts communication packets using transaction keys authenticated by the mutual authentication unit 516. The storage area 111 stores information on a plurality of services.

The synthetic key generating unit 514 is capable of executing a synthetic key generating algorithm (i.e., a synthetic key generating algorithm 1). For example, an algorithm employing Single-DES (Data Encryption Standard) may be adopted as the synthetic key generating algorithm 1.

The packet encryption/decryption unit 520 is capable of executing a packet encryption/decryption algorithm (i.e., a packet encryption/decryption algorithm 1). For example, an algorithm employing Single-DES may be adopted as the packet encryption/decryption algorithm 1. In addition, information on each of various services stored in the storage area (or a memory area) 111 may include a service key (i.e., a service key 1) used when accessing (e.g., reading/writing) the services.

An arrow directed to the synthetic key generating unit 514 from the storage area 111 shown in FIG. 3 denotes that the synthetic key generating unit 514 generates synthetic keys A and B from, for example, area keys and service keys. The area keys include an area 0 key and an area 1 key. The service keys include a balance service key and an external device access service key.

The synthetic key generating unit 514 generates the synthetic keys A and B in the following manner, for example. The synthetic key generating unit 514 firstly generates the synthetic key A by sequentially encrypting "a system key 1" with "an area 0 key 1", "an area 1 key 1", and "an area 2 key 1". The synthetic key generating unit 514 then generates the synthetic key B by sequentially encrypting the synthetic key A with "a service 1 key 1", "a service 2 key 1", and "a service 3 key 1". Generation of the synthetic keys in the above-described manner is only an example, and the synthetic keys A and B may be generated according to any method. A detailed description of the system keys, the area keys, and the service keys is given below.

The mutual authentication unit 516 (i.e., a first mutual authentication unit or a second mutual authentication unit) performs first and second authentication operations. In the first authentication operation, a controller 133 is authenticated. In the second authentication operation, an external device, such as an external mobile terminal 104, is authenticated.

A unit that performs the first authentication operation and a unit that performs the second authentication operation of the mutual authentication unit 516 according to the embodiment may be separated or integrated.

The key setting unit 522 sets transaction keys 1 and 2 used for encrypting/decrypting data by the packet encryption/decryption unit 520 on the basis of the random numbers A and B used in the mutual authentication unit 516.

The key setting unit 522 according to the embodiment may change the transaction key and set a new transaction key for every transaction operation, or may set the transaction key for a plurality of transaction operations.

The above-described key setting unit (i.e., a first communication key setting unit or a second communication key setting unit) 522 sets a first transaction key (i.e., a first communication key) based on the random number generated in the authentication operation of the controller 133 performed by the mutual authentication unit 516. The key setting unit 522 also sets a second transaction key (i.e., a second communication key) based on the random number generated in the authentication operation of the external mobile terminal 104.

In addition, a unit that sets the first transaction key and a unit that sets the second transaction key of the key setting unit 522 according to the embodiment may be separated or integrated.

The command executing unit 523 executes various processing operations according to received commands. For example, the command executing unit 523 stores the data decrypted by the packet encryption/decryption unit 520 in a predetermined storage area or reads the data from the predetermined storage area.

Additionally, since the external mobile terminal 104 has substantially the same detailed configuration as the mobile terminal 101, the description thereof is omitted. The near-field communication device 141 included in the external mobile terminal 104 includes a communication unit, a synthetic key generating unit for generating synthetic keys, a mutual authentication unit for performing mutual authentication of external information processing apparatuses using random numbers and synthetic keys, a random number generating unit, a packet encryption/decryption unit for encrypting and decrypting communication packets using transaction keys authenticated by the mutual authentication unit, a key setting unit, and a command executing unit.

Various function blocks of the near-field communication device 135 have been described above. Each of the function blocks (i.e., at least one of the communication unit 512, the synthetic key generating unit 514, the mutual authentication unit 516, the random number generating unit 518, the packet encryption/decryption unit 520, the key setting unit 522, the command executing unit 523, and the storage area 111) may be included in the near-field communication device 135 as hardware having the above-described functions. Alternatively, each function block may be implemented by executable programs, stored in the storage unit 313 or the like, that causes a computer to implement the above-described functions.

(Structure of Storage Area)

Figure 4:
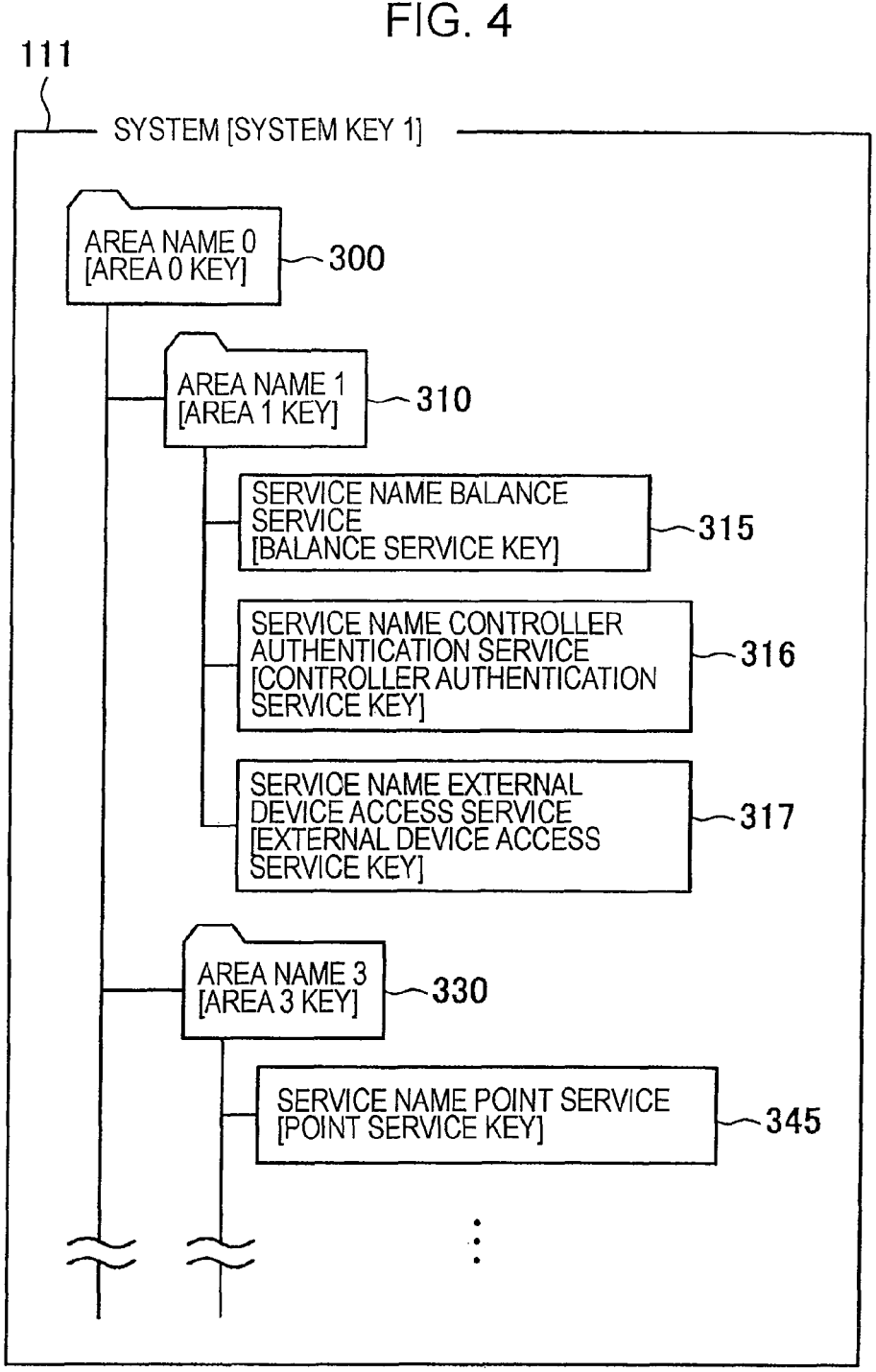
FIG. 4 is an explanatory diagram schematically showing an example of a storage area included in a mobile terminal according to an embodiment.

A file system formed in the storage area allocated in a storage unit 313 has a hierarchical structure constituted by "areas" and "services" as shown in FIG. 4. The areas correspond to folders, and it is possible to create another area under an area hierarchically.

The services define data access types and authorities. "Access keys (e.g., area keys or service keys)" set for the areas and services prevent an unauthorized person from accessing the services, and implement an application firewall.

Use of "synthetic keys" created by organizing a plurality of access keys allows users to open a plurality of files to be accessed with one mutual authentication operation.

In the embodiment, the access keys used for performing reading/writing operations in the areas are referred to as "area keys". The access keys used for performing reading/writing operations of the services are referred to as "service keys".

In addition, as shown in FIG. 4, although the description is given for a case where one area/service holds one area key/service key for example, the present invention is not limited to this particular example. For example, the one area/service may hold two area keys/service keys.

FIG. 4 is a schematic diagram showing a storage area 111 included in a mobile terminal 101. The storage area 111 has the following hierarchical structure. Although the storage area 111 according to the embodiment is described for a case where the storage area 111 is allocated in the storage unit 313, allocation of the storage area 111 is not limited to this particular example as long as the storage area 111 is capable of securely storing data.

An area name (1) 310 and an area name (3) 330 are allocated under an area name (0) 300. Under the area name (1) 310, a balance service 315, a controller authentication service 316, and an external device access service 317 are created. Accordingly, it is possible to create another area under an area hierarchically. Under the area name (3) 330, a point service 345 is created.

The balance service 315 stores information indicating a balance (i.e., balance information) of value information such as electronic money, for example. Users can know the balance of the value information by accessing the balance information.

The controller authentication service 316 stores a controller authentication service key. The controller authentication service key is used for a mutual authentication operation between a near-field communication device 135 and a controller 133 included in the mobile terminal 101.

The external device access service 317 stores an external device access service key. The external device access service key is used for a mutual authentication operation between the near-field communication device 135 and an external device such as an external mobile terminal 104.

Each area/service shown in FIG. 4 holds one area key/service key. The system key of the storage area 111 allocated in the storage unit 313 is denoted by [system key 1]. The area key is defined as "area name [area key 1]". In addition, the service key is defined as "service name [service key 1]".

(Two-Way Secure Communication Method)

Figure 5:
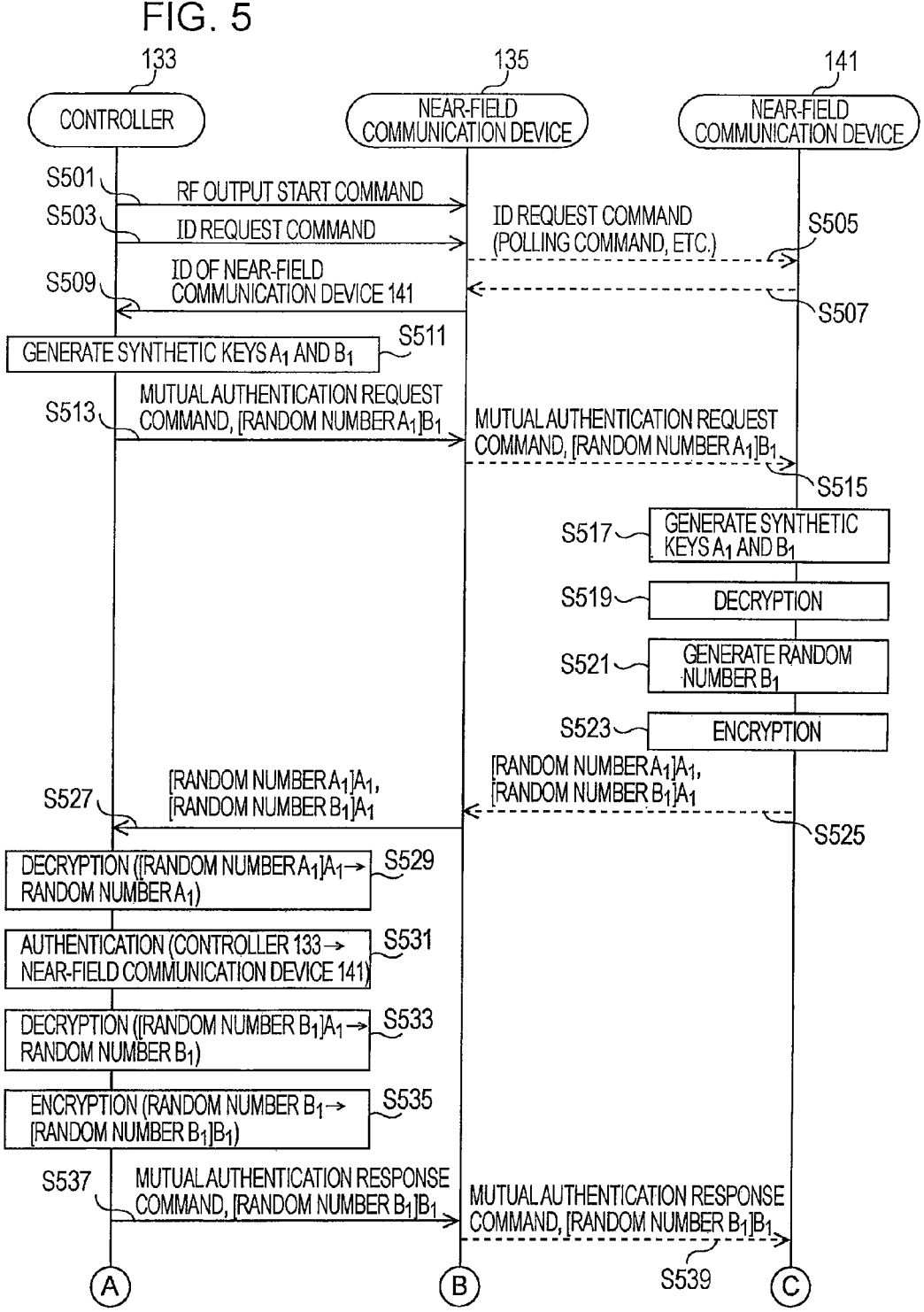
FIG. 5 is a sequence diagram schematically showing an example of a two-way secure communication according to an embodiment.
Figure 6:
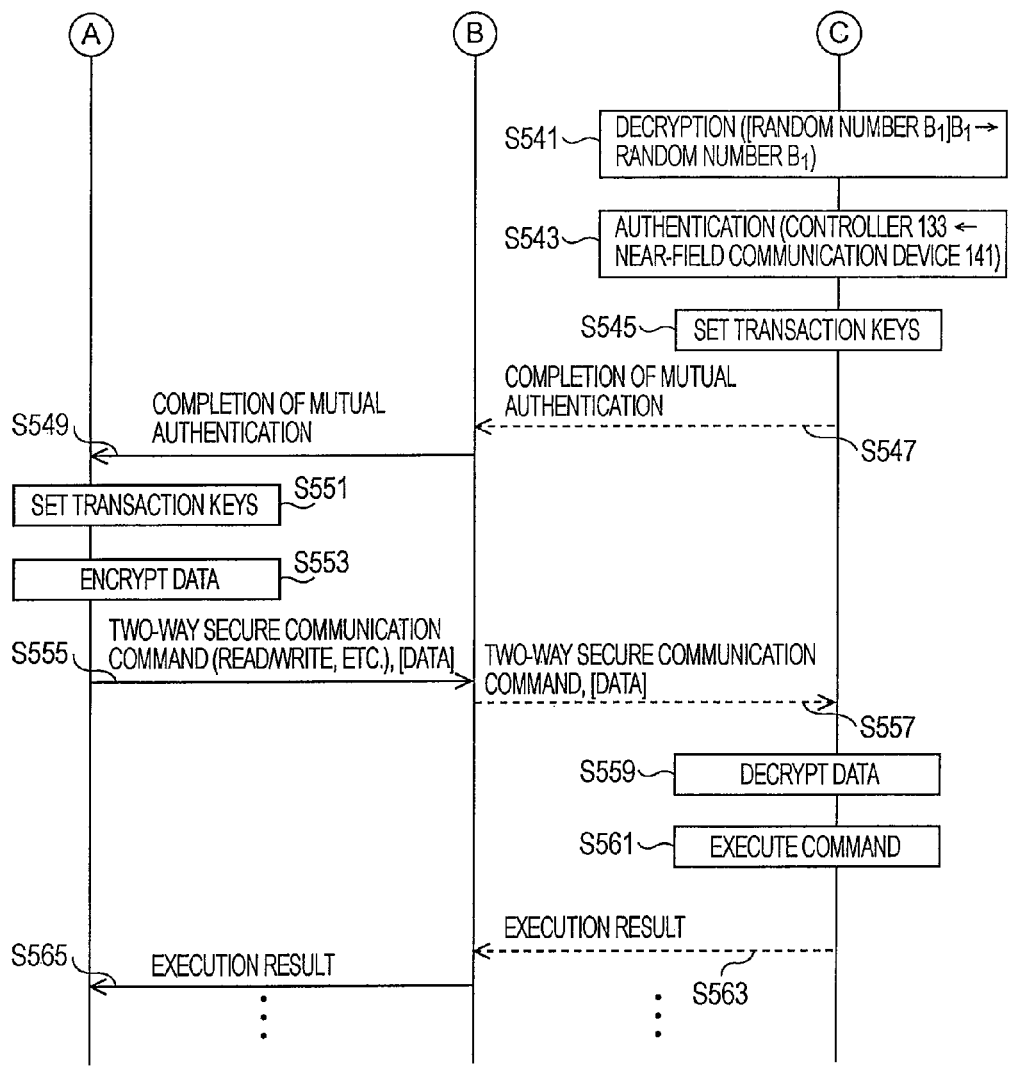
FIG. 6 is a sequence diagram schematically showing an example of a two-way secure communication according to an embodiment.

Now, referring to FIGS. 5 and 6, a data communication method according to an embodiment will be described. FIGS. 5 and 6 are sequence diagrams showing an outline of the data communication method according to the embodiment.

As shown in FIG. 5, a controller 133 sends an RF (Radio Frequency) output start command to a near-field communication device 135 included in a mobile terminal 101 (at STEP S501) in order to cause the near-field communication device 135 to start outputting radio signals.

The controller 133 then sends an ID request command to the near-field communication device 135 (at STEP S503) in order to obtain an ID of an external device (e.g., an external mobile terminal 104) residing outside.

Upon receiving the ID request command from the controller 133, the near-field communication device 135 wirelessly transmits, after modulating the command, the ID request command to the external mobile terminal 104 via an antenna 301 (at STEP S505). The ID request command may be, for example, a polling command or the like.

Upon receiving the ID request command, a near-field communication device 141 included in the external mobile terminal 104 executes the command and obtains the ID of the near-field communication device 141 stored therein, and wirelessly transmits the ID via an antenna (at STEP S507).

Upon wirelessly receiving the ID of the near-field communication device 141, the near-field communication device 135 directly transfers, after demodulating the ID, the ID of the near-field communication device 141 to the controller 133 (at STEP S509). The controller 133 can identify a communication partner and send/receive data by obtaining such IDs.

The synthetic key generating unit (not shown) 514 included in the controller 133 generates synthetic keys $A_1$ and $B_1$ (at STEP S511) in order to perform mutual authentication with the near-field communication device 141 and to perform data communication. For example, the synthetic key generating unit generates the synthetic key $A_1$ from a balance service key and other service keys, when accessing the balance service stored in the near-field communication device 141, for example. The synthetic key generating unit generates the synthetic key $B_1$ from one or more area keys residing at the upper layer of the balance service.

After the synthetic key generating unit has generated the synthetic keys $A_1$ and $B_1$ (at STEP S511), the controller 133 generates a random number $A_1$. The controller 133 encrypts the random number $A_1$ with the synthetic key $B_1$. The controller 133 then transmits the encrypted random number to the near-field communication device 141 of the external mobile terminal 104 together with a mutual authentication request command (at STEP S513).

Upon receiving the mutual authentication request command from the controller 133 to the near-field communication device 141, the near-field communication device 135 wirelessly transmits, after modulating the data, the mutual authentication request command and the encrypted random number [random number $A_1]B_1$ to the external communication device 104 via the antenna 301 (at STEP S515). Although the commands, such as the mutual authentication request command, to be transmitted contain, but are not limited to, the ID of the communication partner. In addition, the expression [random number $A_1]B_1$ denotes the random number $A_1$ encrypted with the synthetic key $B_1$.

Upon receiving the mutual authentication request command and the encrypted random number [random number $A_1]B_1$ from the near-field communication device 135, the near-field communication device 141 executes the mutual authentication request command, and generates synthetic keys $A_1$ and $B_1$ (at STEP S517). The near-field communication device 141 generates the synthetic keys $A_1$ and $B_1$ substantially in the same manner as described in the step of generating the synthetic keys (i.e., STEP S511) performed by the controller 133. Thus, the detailed description thereof is omitted here.

The packet encryption/decryption unit of the near-field communication device 141 then decrypts the encrypted random number [random number $A_1]B_1$ received together with the mutual authentication request command with the synthetic key $B_1$ generated at STEP S517 (at STEP S519). The near-field communication device 141 can obtain the random number $A_1$ when the decryption of the encrypted random number [random number $A_1]B_1$ is successfully performed.

The random number generating unit of the near-field communication device 141 generates a random number $B_1$ (at STEP S521). The packet encryption/decryption unit encrypts the random number $B_1$ with the synthetic key $A_1$ that was generated previously, and also encrypts the random number $A_1$ obtained at STEP S519 with the synthetic key $A_1$ (at STEP S523).

The communication unit of the near-field communication device 141 wirelessly transmits the encrypted random numbers [random number $A_1]A_1$ and [random number $B_1]A_1$ encrypted at STEP S523 to the controller 133 (at STEP S525). As shown in FIGS. 5 and 6, the near-field communication device 135 serves as a relay device in the communication between the controller 133 and the near-field communication device 141, and directly transfers the data.

Upon wirelessly receiving the encrypted random numbers [random number $A_1]A_1$ and [random number $B_1]A_1$ transmitted from the near-field communication device 141 to the controller 133 via the antenna 301, the near-field communication device 135 demodulates the radio signal by the modem 305. The near-field communication device 135 then transfers the encrypted random numbers [random number $A_1]A_1$ and [random number $B_1]A_1$ to the controller 133 (at STEP S527).

The controller 133 decrypts the encrypted random number [random number $A_1]A_1$ received from the near-field communication device 135 with the synthetic key $A_1$ generated at STEP S511 (at STEP S529), and obtains the random number $A_1$.

The controller 133 then compares the random number $A_1$ generated when transmitting the mutual authentication request command at STEP S513 and the random number $A_1$ obtained at STEP S529, and confirms the agreement, such that the controller 133 authenticates the near-field communication device 141 (at STEP S531). Accordingly, a one-way authentication operation from the controller 133 to the near-field communication device 141 is completed.

The packet encryption/decryption unit 520 of the controller 133 decrypts the other encrypted random number [random number $B_1]A_1$ received from the near-field communication device 135 at STEP S527 with the synthetic key $A_1$, and obtains the random number $B_1$ (at STEP S533).

The controller 133 encrypts the random number $B_1$ obtained by the decryption performed at STEP S533 with the synthetic key $B_1$ (at STEP S535).

The controller 133 sends the mutual authentication response command and the encrypted random number [random number $B_1]B_1$ encrypted at STEP S535 to the near-field communication device 141 (at STEP S537) in order to cause the near-field communication device 141 to perform the authentication.

Upon receiving the mutual authentication response command and command data (i.e., [random number $B_1]B_1$) from the controller 133, the near-field communication device 135 wirelessly transmits, after modulating the data by the modem 305, the mutual authentication response command and the encrypted random number [random number $B_1]B_1$ to the external mobile terminal 104 via the antenna 301 (at STEP S539).

Referring to FIG. 6, processing following the steps shown in FIG. 5 will be described next. Upon receiving the mutual authentication response command transmitted at STEP S539, the packet encryption/decryption unit of the near-field communication device 141 decrypts the command data [random number $B_1]B_1$ with the synthetic key $B_1$ (at STEP S541).

The mutual authentication unit of the near-field communication device 141 then compares the random number $B_1$ generated by the random number generating unit at STEP S521 and the random number $B_1$ obtained at STEP S541, and confirms the agreement, such that the mutual authentication unit authenticates the validity of the controller 133 (at STEP S543). Accordingly, the mutual authentication operation between the controller 133 and the near-field communication device 141 is completed.

After the completion of the mutual authentication (at STEP S543), the key setting unit of the near-field communication device 141 sets the random numbers $A_1$ and $B_1$ generated by the random number generating unit as transaction keys 1 and 2 (at STEP S545). The key setting unit then informs the packet encryption/decryption unit of the set transaction keys 1 and 2.

The mutual authentication unit of the near-field communication device 141 then wirelessly transmits a command or a message to the controller 133 via the antenna (at STEP S547) to inform the controller 133 of the completion of the mutual authentication.

Upon receiving the command or message informing the controller 133 of the completion of the mutual authentication via the antenna 301, the near-field communication device 135 directly transfers, after demodulating the signal by the modem 305, the command or message informing the completion of the mutual authentication to the controller 133 (at STEP S549).

Upon receiving the command or message informing the controller 133 of the completion of the mutual authentication, the controller 133 sets the transaction keys 1 and 2 in the same procedure as the above-described setting operation performed by the key setting unit of the near-field communication device 141 (at STEP S551).

The above-described steps are those of advance processing for the data communication between the controller 133 and the external mobile terminal 104. Steps following STEP S551 are those of processing performed when data communication is performed between the controller 133 and the external mobile terminal 104.

A data transmission operation from the controller 133 to the external mobile terminal 104 starts with data encryption as shown in FIG. 6 (at STEP S553). The packet encryption/decryption unit (not shown) of the controller 133 encrypts data and decrypts the encrypted data using at least one of the transaction keys 1 and 2 as an encryption/decryption key. More specifically, the transaction key 1 is used as the encryption/decryption key, whereas the transaction key 2 is treated as a dummy key. Alternatively, both the transaction keys 1 and 2 are used as a dual encryption/decryption key. More specifically, the data is first encrypted using the transaction key 1, and further encrypted using the transaction key 2 so as to create encrypted data [data]. However, the encryption/decryption key is not limited to this particular example.

The controller 133 sends a two-way secure communication command and the data encrypted at STEP S553 (i.e., [data]) to the near-field communication device 141 (at STEP S555) in order to perform the two-way secure communication between the controller 133 and the near-field communication device 141 that have been mutually authenticated. The expression [data] denotes the data encrypted with at least one of the transaction keys 1 and 2.

In the two-way secure communication command, the data (i.e., the command data) on which the command is executed between two parties is encrypted. Kinds of the two-way secure communication command includes, but are not limited to, a write command instructing to write the data in the storage area of the communication partner and a read command instructing to read data stored in the storage area of the communication partner.

Upon receiving the two-way secure communication command sent from the controller 133 to the near-field communication device 141, the near-field communication device 135 modulates the data including the two-way secure communication command and the encrypted data [data] by the modem 305. The near-field communication device 135 then wirelessly transmits the modulated data to the near-field communication device 141 via the antenna 301 (at STEP S557).

Upon receiving the two-way secure communication command and the encrypted data [data] from the near-field communication device 135, the IC control unit (not shown) of the near-field communication device 141 instructs the decryption of the encrypted data [data] in order to execute the two-way secure communication command.

In response to the decryption command given by the IC control unit, the packet encryption/decryption unit decrypts the encrypted data [data] with at least one of preset transaction keys 1 and 2 (at STEP S559).

The command executing unit then executes the processing according to the received command (at STEP S561). For example, if the decrypted data contains a read address for the data and the received command is a read command instructing reading of the data according to the read address, the command executing unit reads out the data from the storage area of the storage unit according to the address specified in the data. However, the command is not limited to this particular example.

Then, data indicating the execution result is wirelessly transmitted via the antenna 301 (at STEP S563) in order to inform the controller 133 of the execution result by the command executing unit. Kinds of the execution result may include, but are not limited to, contents of data stored in the predetermined read address and information indicating result (e.g., success/error) of the writing operation. In addition, the execution result may be encrypted with at least one of the transaction keys 1 and 2, if necessary.

Upon wirelessly receiving the execution result transmitted from the near-field communication device 141 to the controller 133 via the antenna 301, the near-field communication device 135 demodulates the execution result by the modem 305. The near-field communication device 135 then transfers the execution result to the controller 133 (at STEP S565).

This is the end of the description regarding the series of steps in the two-way secure communication method according to the embodiment. The above-described two-way secure communication method allows the controller 133 to obtain the balance information of the value information held in the near-field communication device 141 of the external mobile terminal 104 or the like and to display the information on a screen in the display unit of the mobile terminal 101 when the user requests the controller 133 to display the balance information of the external mobile terminal 104, for example.

(Three-Way Secure Communication Method)

Now, referring to FIGS. 7 to 9, a data communication method according to an embodiment will be described. FIGS. 7 to 9 are sequence diagrams showing an outline of a three-way data communication method according to the embodiment.

As shown in FIG. 7, a controller 133 sends an ID request command to a near-field communication device 135 in order to obtain an ID of the near-field communication device 135 (at STEP S703).

Upon receiving the ID request command addressed thereto from the controller 133, the near-field communication device 135 executes the command, and obtains the ID of the near-field communication device 135 stored therein. The near-field communication device 135 then sends the ID to the controller 133 (at STEP S707).

The synthetic key generating unit (not shown) included in the controller 133 then generates synthetic keys $A_2$ and $B_2$ in order to perform mutual authentication and data communication with the near-field communication device 135 (at STEP S711). The synthetic key generating unit generates the synthetic key $A_2$ from, for example, the controller authentication service key used for the authentication of the near-field communication device 135 and other service keys. The synthetic key generating unit generates the synthetic key $B_2$ from one or more area keys residing at the upper layer of the controller authentication service. The synthetic key generation method is not limited to this particular example.

After generating the synthetic keys $A_2$ and $B_2$ (at STEP S711), the controller 133 generates a random number $A_2$ and encrypts the random number $A_2$ with the synthetic key $B_2$. The controller 133 then sends the encrypted random number [random number $A_2$]$B_2$ to the near-field communication device 135 together with a mutual authentication request command (at STEP S713). Commands to be sent, such as the mutual authentication request command, include, but are not limited to, IDs of the communication partners.

Upon receiving the mutual authentication request command and the encrypted random number [random number $A_2]B_2$, the near-field communication device 135 executes the mutual authentication request command. Firstly, the synthetic key generating unit 514 generates the synthetic keys $A_2$ and $B_2$ (at STEP S717). The near-field communication device 135 generates the synthetic keys $A_2$ and $B_2$ substantially in the same manner as the controller 133 or the near-field communication device 141 described above, thus the detailed description thereof is omitted.

The packet encryption/decryption unit 520 included in the near-field communication device 135 then decrypts the encrypted random number [random number $A_2]B_2$ received together with the mutual authentication request command with the synthetic key $B_2$ generated at STEP S717 (at STEP S719). The mutual authentication unit 516 can obtain the random number $A_2$ when the decryption of the encrypted random number [random number $A_2]B_2$ is successfully performed.

The random number generating unit 518 included in the near-field communication device 135 generates a random number $B_2$ (at STEP S721). The packet encryption/decryption unit 520 encrypts the random number $B_2$ with the synthetic key $A_2$ that was generated previously and the random number $A_2$ decrypted at STEP S719 with the synthetic key $A_2$ (at STEP S723).

The communication unit 512 of the near-field communication device 135 sends the encrypted random numbers [random number $A_2]A_2$ and [random number $B_2]A_2$ encrypted at STEP S723 to the controller 133 (at STEP S725). The near-field communication device 135, different from the data communication shown in FIGS. 5 and 6, authenticates both the controller 133 and the near-field communication device 141 so that secure data communication is implemented between the controller 133 and the near-field communication device 135, between the near-field communication devices 135 and 141, and between the controller 133 and the near-field communication device 141 in various manners.

The controller 133 then decrypts the encrypted random number [random number $A_2]A_2$ received from the near-field communication device 135 with the synthetic key $A_2$ generated at STEP S711 (at STEP S729) so as to obtain the random number $A_2$.

The controller 133 then compares the random number $A_2$ generated when sending the mutual authentication request command at STEP S713 and the random number $A_2$ obtained by decryption performed at STEP S729, and confirms the agreement, such that the controller 133 authenticates the validity of the near-field communication device 135 (at STEP S731). Accordingly, a one-way authentication operation from the controller 133 to the near-field communication device 135 is completed.

The packet encryption/decryption unit of the controller 133 then decrypts the other encrypted random number [random number $B_2]A_2$ received from the near-field communication device 135 at STEP S725 with the synthetic key $A_2$, and obtains the random number $B_2$ (at STEP S733).

The packet encryption/decryption unit of the controller 133 then encrypts the random number $B_2$ obtained by the decryption operation performed at STEP S733 with the synthetic key $B_2$ (at STEP S735).

The controller 133 sends the encrypted random number [random number $B_2]B_2$ encrypted at STEP S735 and a mutual authentication response command to the near-field communication device 135 (at STEP S737) in order to cause the near-field communication device 135 to authenticate the controller 133.

After the near-field communication device 135 receives the mutual authentication response command and the command data (i.e., the encrypted random number [random number $B_2]B_2$) sent from the controller 133, the packet encryption/decryption unit 520 of the near-field communication device 135 decrypts the command data [random number $B_2]B_2$ with the synthetic key $B_2$ (at STEP S741).

The mutual authentication unit 516 of the near-field communication device 135 then compares the random number $B_2$ generated by the random number generating unit 518 at STEP S721 and the random number $B_2$ obtained at STEP S741, and confirms the agreement, such that the mutual authentication unit 516 authenticates the validity of the controller 133 (at STEP S743). Accordingly, a mutual authentication operation between the controller 133 and the near-field communication device 135 is completed.

After the completion of the mutual authentication (at STEP S743), the key setting unit 518 of the near-field communication device 135 sets the random numbers $A_2$ and $B_2$ generated by the random number generating unit 518 as the first transaction keys (i.e., the transaction keys 1-1 and 2-1) (at STEP S745). The key setting unit 518 then informs the packet encryption/decryption unit 520 of the set transaction keys 1-1 and 2-1.

The mutual authentication unit 516 of the near-field communication device 135 then sends a command or a message to the controller 133 (at STEP S747) to inform the controller 133 of the completion of the mutual authentication.

Upon receiving the command or message informing the controller 133 of the completion of the mutual authentication, the controller 133 sets the first transaction keys (at STEP S751). The procedure for setting the first transaction keys is the same as the above-described procedure performed by the key setting unit 518 of the near-field communication device 135.

The above-described steps are those of advance processing for the data communication between the controller 133 and the near-field communication device 135. Steps following STEP S751 are those of advance processing for the data communication between the near-field communication devices 135 and 141.

As shown in FIG. 8, the controller 133 sends an RF (Radio Frequency) output start command to the near-field communication device 135 (at STEP S801) in order to cause the near-field communication device 135 to start outputting radio signals.

The controller 133 then sends the ID request command to the near-field communication device 135 (at STEP S803) in order to obtain an ID of the external device such as the external mobile terminal 104.

Upon receiving the ID request command from the controller 133, the near-field communication device 135 wirelessly transmits, after modulating the command, the ID request command to the external mobile terminal 104 via the antenna 301 (at STEP S805).

Upon receiving the ID request command, the near-field communication device 141 included in the external mobile terminal 104 obtains the ID of the near-field communication device 141 stored therein, and wirelessly transmits the ID via the antenna (at STEP S807).

Upon wirelessly receiving the ID of the near-field communication device 141, the near-field communication device 135 directly transfers, after demodulating the ID, the ID of the near-field communication device 141 to the controller 133 (at STEP S809).

The controller 133 then sends an external device mutual authentication execution command to the near-field communication device 135 (at STEP S811) in order to cause the near-field communication devices 135 and 141 to perform mutual authentication and data communication.

When the IC control unit 307 of the near-field communication device 135 receives the external device mutual authentication execution command, the synthetic key generating unit 514 generates synthetic keys $A_3$ and $B_3$ (at STEP S812). For example, the synthetic key generating unit 514 generates the synthetic key $A_3$ from the external device access service key and other service keys stored in the storage area 111, when accessing the storage area of the near-field communication device 141, i.e., the external device. The synthetic key generating unit 514 generates the synthetic key $B_3$ from one or more area keys residing at the upper layer of the external device access service. The synthetic key generation method is not limited to this particular example.

After the synthetic key generating unit 514 has generated the synthetic keys $A_3$ and $B_3$ (at STEP S812), the random number generating unit 518 generates a random number $A_3$. The packet encryption/decryption unit 520 encrypts the random number $A_3$ with the synthetic key $B_3$.

The communication unit 512 of the near-field communication device 135 transmits the encrypted random number [random number $A_3$]$B_3$ to the near-field communication device 141 of the external mobile terminal 104 via the antenna 301 together with the mutual authentication request command (at STEP S813). The radio signal transmitted at STEP S813 includes the ID of the near-field communication device 141.

Upon receiving the mutual authentication request command and the encrypted random number [random number $A_3$]$B_3$ from the near-field communication device 135 to the near-field communication device 141, the near communication device 141 executes the mutual authentication request command. Synthetic keys $A_3$ and $B_3$ are generated in the same manner as STEP S812 (at STEP S817).

The packet encryption/decryption unit of the near-field communication device 141 then decrypts the encrypted random number [random number $A_3$]$B_3$ received together with the mutual authentication request command with the synthetic key $B_3$ generated at STEP S817 (at STEP S819). The near-field communication device 141 can obtain the random number $A_3$ when the decryption of the encrypted random number [random number $A_3$]$B_3$ is successfully performed.

The random number generating unit of the near-field communication device 141 generates a random number $B_3$ (at STEP S821). The packet encryption/decryption unit of the near-field communication device 141 encrypts the random number $B_3$ with the synthetic key $A_3$ that was generated previously, and also encrypts the random number $A_3$ obtained at STEP S819 with the synthetic key $A_3$ (at STEP S823).

The communication unit of the near-field communication device 141 wirelessly transmits the encrypted random numbers [random number $A_3$]$A_3$ and [random number $B_3$]$A_3$ encrypted at STEP S823 to the near-field communication device 135 (at STEP S825).

Upon wirelessly receiving the encrypted random numbers [random number $A_3$]$A_3$ and [random number $B_3$]$A_3$ transmitted thereto from the near-field communication device 141 via the antenna 301, the packet encryption/decryption unit 520 of the near-field communication device 135 decrypts, after demodulating the random numbers by the modem 305, the encrypted random number [random number $A_3$]$A_3$ (at STEP S829).

The mutual authentication unit 516 then compares the random number $A_3$ generated when transmitting the mutual authentication request command at STEP S813 and the random number $A_3$ obtained at STEP S829, and confirms the agreement, such that the near-field communication device 135 authenticates the validity of the near-field communication device 141 (at STEP S831). Accordingly, a one-way authentication operation from the near-field communication device 135 to the near-field communication device 141 is completed.

The packet encryption/decryption unit 520 of the near-field communication device 135 decrypts the other encrypted random number [random number $B_3$]$A_3$ received at STEP S825 with the synthetic key $A_3$, and obtains the random number $B_3$ (at STEP S833).

The packet encryption/decryption unit 520 of the near-field communication device 135 encrypts the random number $B_3$ obtained by the decryption performed at STEP S833 with the synthetic key $B_3$ so as to obtain the encrypted random number [random number $B_3$]$B_3$ (at STEP S835).

The near-field communication device 135 wirelessly transmits the mutual authentication response command and the encrypted random number [random number $B_3$]$B_3$ encrypted at STEP S835 to the near-field communication device 141 via the antenna 301 (at STEP S837) in order to cause the near-field communication device 141 to authenticate the near-field communication device 135.

Upon receiving the mutual authentication response command transmitted at STEP S837, the packet encryption/decryption unit of the near-field communication device 141 then decrypts the encrypted random number [random number $B_3$]$B_3$ with the synthetic key $B_3$ (at STEP S841).

The mutual authentication unit of the near-field communication device 141 then compares the random number $B_3$ generated by the random number generating unit at STEP S821 and the random number $B_3$ obtained at STEP S841, and confirms the agreement, such that the mutual authentication unit authenticates the validity of the near-field communication device 135 (at STEP S843). Accordingly, the mutual authentication operation between the near-field communication devices 135 and 141 is completed.

After the completion of the mutual authentication (at STEP S843), as shown in FIG. 9, the key setting unit of the near-field communication device 141 sets the random numbers $A_3$ and $B_3$ generated by the random number generating unit of the near-field communication device 141 as second transaction keys (i.e., transaction keys 1-2 and 2-2) (at STEP S845). The key setting unit then informs the packet encryption/decryption unit of the near-field communication device 141 of the set transaction keys 1-2 and 2-2.

The mutual authentication unit of the near-field communication device 141 wirelessly transmits a command or a message to the controller 133 via the antenna (at STEP S847) to inform the controller 133 of the completion of the mutual authentication.

After the near-field communication device 135 receives the command or message informing the controller 133 of the completion of the mutual authentication via the antenna 301, the modem 305 demodulates the command or message.

The key setting unit 522 of the near-field communication device 135, like the near-field communication device 141, sets the random numbers $A_3$ and $B_3$ generated by the random number generating unit 518 as second transaction keys (i.e., transaction keys 1-2 and 2-2) (at STEP S848). The key setting unit then informs the packet encryption/decryption unit of the near-field communication device 135 of the set transaction keys 1-2 and 2-2.

The command or message informing the controller 133 of the completion of the mutual authentication demodulated by the modem 305 is transferred to the controller 133 (at STEP S849).

During the above-described steps, the mutual authentication between the controller 133 and the near-field communication devices 135 and 141 is performed, and the advance processing for the data communication is completed. Steps following STEP S849 are those of processing performed when secure data communication is performed between the controller 133, the near-field communication device 135, and the external mobile terminal 104.

As shown in FIG. 9, a data transmission operation from the controller 133 to the external mobile terminal 104 starts with data encryption with the first transaction key (at STEP S853). The packet encryption/decryption unit (not shown) of the controller 133 encrypts data and decrypts the encrypted data using at least one of the transaction keys 1-1 and 2-1 as an encryption/decryption key. The more detailed description is omitted here since the process is substantially the same as that described in the two-way secure communication method.

The controller 133 sends a three-way secure communication command and the data encrypted at STEP S853 (i.e., [data]) to the near-field communication device 135 (at STEP S855) in order to perform the secure communication between the controller 133 and the near-field communication devices 135 and/or between the near-field communication devices 135 and 141 that have been mutually authenticated.

In the three-way secure communication command, the data (i.e., the command data) on which the command is executed between the three parties is encrypted. Kinds of the three-way secure communication command includes, but are not limited to, a write command instructing to write data in the storage area of the communication partner (e.g., the near-field communication device 135 or 141) and a read command instructing to read data stored in the storage area of the communication partner.

Upon receiving the three-way secure communication command sent from the controller 133 to the near-field communication device 141, the packet encryption/decryption unit 520 of the near-field communication device 135 decrypts the encrypted data [data] with the first transaction key (at STEP S856). Then, the packet encryption/decryption unit encrypts the decrypted data with the second transaction key that is valid in the communication with the near-field communication device 141 (at STEP S857). As in the case of the first transaction key, at least one of the transaction keys 1-2 and 2-2 is used for the encryption/decryption as the second transaction key.

The communication unit 512 of the near-field communication device 135 wirelessly transmits the encrypted data [data], which has been modulated by the modem 305 and encrypted with the second transaction key, and the three-way secure communication command to the near-field communication device 141 via the antenna 301 (at STEP S858).

Upon receiving the three-way secure communication command and the encrypted data [data] from the near-field communication device 135, the IC control unit (not shown) of the near-field communication device 141 instructs the decryption of the encrypted data [data] in order to execute the three-way secure communication command.

In response to the decryption command given by the IC control unit, the packet encryption/decryption unit decrypts the encrypted data [data] with at least one of the preset second transaction keys 1-2 and 1-2 (at STEP 859).

The command executing unit included in the near-field communication device 141 then executes the processing according to the received command (at STEP S861). For example, if the decrypted data contains a read address for the data and the received command is a read command instructing reading of data according to the read address, the command executing unit reads out the data from the storage area of the storage unit according to the address specified in the received data. However, the command is not limited to this particular example.

Then, data indicating the execution result is wirelessly transmitted via the antenna 301 (at STEP 5863) in order to inform the controller 133 of the execution result by the command executing unit. Kinds of the execution result may include, but are not limited to, contents of data stored in the predetermined read address and information indicating result (e.g., success/error) of the writing operation. In addition, the execution result is encrypted with the second transaction key, if necessary.

Upon wirelessly receiving the execution result transmitted from the near-field communication device 141 to the controller 133 via the antenna 301, the near-field communication device 135 demodulates the execution result using the modem 305. The near-field communication device 135 then transfers the execution result to the controller 133 (at STEP S865).

On the other hand, when the controller 133 writes/reads data in the near-field communication device 135, the packet encryption/decryption unit of the controller 133 first encrypts the data using at least one of the transaction keys 1-1 and 2-1 of the first transaction keys as the encryption/decryption key (at STEP S867). The encrypted data may contain, but is not limited to, an address in the storage area in the communication partner from which the data is read out and data to be written in a predetermined address in the storage area in the communication partner.

The controller 133 then sends the three-way secure communication command and the encrypted data (i.e., [data]) encrypted at STEP 5867 to the near-field communication device 135 (at STEP S869) in order to perform secure communication between the controller 133 and the near-field communication device 135 which have been mutually authenticated.

Upon receiving the three-way secure communication command from the controller 133 to the near-field communication device 135, the packet encryption/decryption unit 520 of the near-field communication device 135 decrypts the encrypted data [data] with the first transaction key (at STEP S871).

The command executing unit 523 included in the near-field communication device 135 then executes the processing according to the command received from the controller 133 (at STEP S873). For example, if the decrypted data contains a read address for the data and the received command is a read command instructing reading of data according to the read address, the command executing unit 523 reads out the data from the storage area of the storage unit according to the address specified in the received data. However, the command is not limited to this particular example.

Then, data indicating the execution result is sent to the controller 133 (at STEP S875) in order to inform the controller 133 of the execution result by the command executing unit 523. Upon receiving the execution result, the controller 133, for example, displays the balance of the value information stored in the storage area 111 of the near-field communication device 135 on a display of the mobile terminal 101.

This is the end of the description regarding the series of steps in the three-way secure communication method according to the embodiment. The above-described three-way secure communication method allows the controller 133 to obtain the balance information of the value information held in the near-field communication device 135 or 141 and to display the information on the display unit of the mobile terminal 101 when the user requests the controller 133 to display the balance information stored in at least one of the mobile terminal 101 and the external mobile terminal 104, for example. If the mutual authentication has been completed when the controller 133 obtains the balance information or the like, the three-way secure communication method allows the controller 133 to collectively obtain the information from the near-field communication devices 135 and 141, thus significantly improving processing efficiency.

In addition, placing the near-field communication device 135 between the controller 133 and the external device such as the external mobile terminal 104 in the three-way secure communication allows the near-field communication device 135 to process the data sent from the controller 133 and to send the processed data to the near-field communication device 141. For example, when performing data communication between the controller 133 and the near-field communication device 141 included in the external mobile terminal 104, the near-field communication device 135 may append additional value information, such as coupon information, held in the near-field communication device 135, to the data sent from the controller 133. Such a configuration allows various communication patterns. In addition, the above-described configuration simplifies communication processing requiring a plurality of transactions, thus providing more efficient communication processing.

(Status Transition)

Now, referring to FIG. 10, statuses in data communication according to an embodiment and status transitions will be described. FIG. 10 is an explanatory diagram showing an outline of the statuses and status transitions in the data communication according to the embodiment.

As shown in FIG. 10, there are three statuses (i.e., statuses 0 to 2) in the data communication according to the embodiment. Executable commands differ according to each status.

Executable commands at each status and a status to which a current status changes after the execution of the command are shown in status transition patterns (1) to (8) shown in FIG. 10. For example, a status transition pattern "(1) 0→0" denotes that the current status is the status 0 and the post-transition status after the execution of the commands listed in the pattern (1) is also the status 0. As shown in FIG. 10, commands belonging to the pattern (1) include, for example, a two-way secure communication command, an RF output start command, an RF output terminate command, a current status request command, and a reset command.

In addition, as shown in FIG. 10, commands belonging to the pattern (2) include, for example, the two-way secure communication command, the mutual authentication request command, the RF output start command, the RF output terminate command, and the current status request command.

As shown in FIG. 10, commands belonging to the pattern (3) include, for example, the two-way secure communication command, the mutual authentication request command, the three-way secure communication command, the RF output start command, the RF output terminate command, the current status request command, and the external device mutual authentication execution command.

As shown in FIG. 10, a command belonging to the pattern (4) includes, for example, the mutual authentication request command. As shown in FIG. 10, a command belonging to the pattern (5) includes, for example, the mutual authentication response command. In addition, as shown in FIG. 10, a command belonging to the pattern (6) includes, for example, the mutual authentication request command.

Furthermore, a command belonging to the patterns (7) and (8) includes, for example, the reset command.

Upon receiving a command to be executed from the controller 133 or the like, the IC control unit 307 determines whether or not the command is executable at the current status. When the IC control unit 307 determines that the command is not executable, the IC control unit 307 changes the current status so as to make the command executable.

For example, upon receiving the mutual authentication request command at the status 1 from the controller 133, the IC control unit 307 determines that the received command is executable at the current status, i.e., the status 1.

In addition, for example, upon receiving the three-way secure communication command from the controller 133 at the status 1, the IC control unit 307 determines that the command is not executable. The IC control unit 307 changes the current status from the status 1 to the status 2 so as to make the command executable. The IC control unit 307 does not change the status from the status 1 to the status 2 unless the mutual authentication is completed by the mutual communication unit 516, when changing the status to the status 2.

The current status is stored in, for example, a RAM included in the IC control unit 307 and the storage unit 313. The status transition patterns (transition modules) and lists of the commands executable at each status are stored in, for example, a ROM included in the IC control unit 307 and the storage unit 313.

For example, execution of the current status request command among those shown in FIG. 10 allows the controller 133 or the like to obtain (recognize) the current status of the near-field communication device 135. Additionally, execution of the reset command brings the current status to the status 0.

The statuses shown in FIG. 10 are classified according to the completion and incompletion of the mutual authentication of the near-field communication device 135. The mutual authentication is not performed at the status 0. The mutual authentication is now being performed at the status 1. The mutual authentication has been completed at the status 2.

Accordingly, in particular, the three-way secure communication command is not executable at the statuses 0 and 1 and is executable only at the status 2, since it requires the mutual authentication for the near-field communication device 135.

In the description given above, the statuses according to the embodiment are classified into three statuses with respect to the mutual authentication. However, the classification of the statuses is not limited to this particular example. For example, the statuses are classified into one or more statuses with respect to processing loads or a combination of the processing loads and the mutual authentication. When the processing loads are used, the status 0 denotes a status where high processing loads are applied, and executable commands are highly restricted at the status 0, for example. The status 1 denotes a status where medium processing loads are applied, and commands except for those applying high processing loads are executable at the status 1. In addition, the status 2 denotes a status where low processing loads are applied, and all commands are executable at the status 2.

The near-field communication device 135 may not confirm whether or not the packet encryption/decryption unit 520 holds the transaction keys to determine whether the thee-way secure communication command is executable, for example. The IC control unit 307 can easily determine whether or not the three-way communication command is executable by referring to the current status managed by the IC control unit 307.

The above-described series of processing steps may be executed by dedicated hardware or software. When the series of processing steps are performed by software, programs constituting the software are installed in an information processing apparatus such as a general purpose computer and a micro computer, and cause the information processing apparatus to function as a mobile terminal 101.

The programs may be prestored in a hard disk drive (HDD) and a ROM that serve as a storage medium included in a computer.

In addition, the programs may be temporarily or permanently stored (recorded) in a removable recording medium such as a HDD, a flexible disk, a CD-ROM (Compact Disc Read Only Memory), an MO (Magneto-Optical) disc, a DVD (Digital Versatile Disc), a magnetic disk, and a semiconductor memory. Such a removable recording medium may be provided as so-called "package software".

Additionally, the programs may be installed in a computer from the above-described removable recording medium. The programs may also be downloaded to the computer form a Web site, transferred to the computer through an artificial satellite for digital satellite broadcasting, transferred to the computer through a network such as a LAN (Local Area Network) and the Internet with a cable. The computer may receive the programs transferred thereto in such a manner, and install the programs in a hard disk drive.

In this specification, the steps described in a program causing a computer to execute various processing include processing that is executed sequentially in an order described as a flowchart, and also includes processing that is executed in parallel or individually (for example, parallel processing or processing performing with objects), not necessarily sequentially.

Additionally, a single computer may process the program, or distributed processing may be executed on the program by using a plurality of computers.

In the above-described embodiments, description has been given for a case where synthetic keys A and B are generated from an external device access service key and other keys when performing mutual authentication between near-field communication devices 135 and 141 for example. However, the present invention is not limited to this particular example. For example, the synthetic keys A and B may be generated from only the external device access service key. Alternatively, the external device access service key may be set as the synthetic keys A and B. The mutual authentication can be performed between the near-field communication devices 135 and 141 in such a manner.

Additionally, in the above-described embodiments, description has been given for a case where data communication is performed between a controller 133 or a near-field communication device 135 included in a mobile terminal 101 and a near-field communication device 141 included in an external mobile terminal 104 for example. However, the present invention is not limited to this particular example. For example, data communication may be performed between the controller 133 or the near-field communication device 135 and an information processing apparatus 105 through a reader/writer 103 and between the controller 133 or the near-field communication device 135 and the reader/writer 103 in the same manner as that performed with the external mobile terminal 104. The reader/writer 103 may include a storage unit having a storage area, in which one or more service keys and area keys may be stored.

Furthermore, in the above-described embodiments, the synthetic keys A and B may be generated beforehand and stored in a storage area 111, may be generated whenever mutual authentication is performed, or may be treated in another manner.

Each function block included in the near-field communication device 135 has been described above. Each function block (at least one of a communication unit 512, a synthetic key generating unit 514, a mutual authentication unit 516, a random number generating unit 518, a packet encryption/decryption unit 520, a key setting unit 522, a command executing unit 523, and a storage area 111) may be constituted in the near-field communication device 135 as hardware having the corresponding function. Alternatively, each function block may be constituted by programs stored in a storage unit 313 or the like in an executable manner that cases a computer to implement each function.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A mobile terminal comprising:
   a controller that is configured to send a mutual authentication request command, wherein the mutual authentication request command is a single command that is configured to cause authentication of both of the controller and an external device based on synthetic keys generated from a plurality of keys; and
   a communication device including:
   (i) a wireless communication unit configured to perform wireless communication with the external device, the external device being separate from the mobile terminal; and
   (ii) an authentication unit configured to authenticate the controller and the external device, wherein the communication device is configured to:
      (a) receive, from the controller, the mutual authentication request command;
      (b) forward the received mutual authentication request command to the external device, wherein based on the mutual authentication request command, the controller and the external device are both authenticated based on the synthetic keys;
      (c) after the controller is authenticated, perform secure communication with the authenticated controller; and
      (d) after the external device is authenticated, perform secure wireless communication with the authenticated external device,
   wherein the controller is configured to initiate mutual authentication by sending the mutual authentication request command and send first encrypted data generated by using data and a first communication key to the communication device, and
   wherein the communication device is configured to send second encrypted data generated by using the data and a second communication key, different from the first communication key, to the external device.

2. The mobile terminal of claim 1, wherein the authentication unit is configured to request the controller or the external device to authenticate the communication device.

3. The mobile terminal of claim 1, wherein the authentication unit is configured to, in response to an authentication request from the controller, authenticate the external device.

4. The mobile terminal of claim 1, wherein the communication device includes a communication key setting unit configured to, based on a result of the authentication operation performed by the authentication unit, set:

(a) a first communication key used between the communication device and the controller; or (b) a second communication key used between the communication device and the external device.

5. The mobile terminal of claim 4, wherein:

(a) the secure communication performed by the communication device and the authenticated controller uses the first communication key; or (b) the secure wireless communication performed by the communication device and the authenticated external device uses the second communication key.

6. A communication device configured to perform wireless communication with an external device, the communication device comprising:

a wireless communication device configured to perform wireless communication with an external device; and an authentication unit configured to receive, from a controller, a mutual authentication request command, which is a single command that is configured to cause authentication of both of the controller and an external device based on synthetic keys generated from a plurality of keys and forward the received mutual authentication request command to the external device, wherein based on the mutual authentication request command, the controller and the external device are both authenticated based on the synthetic keys, and:

(a) after the controller is authenticated, the communication device and the authenticated controller perform secure communication; and (b) after the external device is authenticated, the communication device and the authenticated external device, perform secure wireless communication, wherein the controller is configured to initiate mutual authentication by sending the mutual authentication request command and send first encrypted data generated by using data and a first communication key to the communication device, and wherein the communication device is configured to send second encrypted data generated by using the data and a second communication key, different from the first communication key, to the external device.

7. The communication device of claim 6, wherein the authentication unit is configured to request the controller or the external device to authenticate the communication device.

8. The communication device of claim 6, wherein the authentication unit is configured to, in response to an authentication request from the controller, authenticate the external device.

9. The communication device of claim 6, which includes a communication key setting unit configured to, based on a result of the authentication operation performed by the authentication unit, set:

(a) a first communication key used between the communication device and the controller; or (b) a second communication key used between the communication device and the external device.

10. The communication device of claim 9, wherein:

(a) the secure communication performed by the communication device and the authenticated controller uses the first communication key; or (b) the secure wireless communication performed by the communication device and the authenticated external device uses the second communication key.

11. A method of operating a mobile terminal including instructions, the method comprising:

(a) causing a processor to execute the instructions to cause a communication device to perform wireless communication with an external device, the communication device including: (i) a wireless communication unit; and (ii) an authentication unit;

(b) causing the processor to execute the instructions to receive, from a controller, a mutual authentication request command, which is a single command that is configured to cause authentication of both of the controller and an external device based on synthetic keys generated from a plurality of keys, and forward the received mutual authentication request command to authenticate the external device, wherein based on the mutual authentication request command, the controller and the external device are both authenticated based on the synthetic keys;

(c) after the controller is authenticated, causing the processor to execute the instructions to cause the communication device and the authenticated controller to perform secure communication; and (d) after the external device is authenticated, causing the processor to execute the instructions to cause the communication device and the authenticated external device to perform secure wireless communication, wherein the controller is configured to initiate mutual authentication by sending the mutual authentication request command and send first encrypted data generated by using data and a first communication key to the communication device, and wherein the communication device is configured to send second encrypted data generated by using the data and a second communication key, different from the first communication key, to the external device.

12. A method of operating a communication device including instructions, the method comprising:

(a) causing a processor to execute the instructions to receive, from a controller, a mutual authentication request command, which is a single command that is configured to cause authentication of both of the controller and an external device based on synthetic keys generated from a plurality of keys, and forward the received mutual authentication request command to the external device, wherein based on the mutual authentication request command, the controller and the external device are both authenticated based on the synthetic keys;

(b) after the controller is authenticated, causing the processor to execute the instructions to cause the communication device and the authenticated controller to perform secure communication; and (c) after the external device is authenticated, causing the processor to execute the instructions to cause the communication device and the authenticated external device controller to perform secure wireless communication, wherein the controller is configured to initiate mutual authentication by sending the mutual authentication request command and send first encrypted data generated by using data and a first communication key to the communication device, and wherein the communication device is configured to send second encrypted data generated by using the data and a second communication key, different from the first communication key, to the external device.

* * * * *